United States Patent
Hatta et al.

(10) Patent No.: US 11,599,083 B2
(45) Date of Patent: Mar. 7, 2023

(54) WORK ANALYSIS APPARATUS FOR ANALYZING WORK INCLUDING SERIES OF ACTIONS PERFORMED BY WORKING SUBJECT

(71) Applicant: Mitsubishi Electric Corporation, Tokyo (JP)

(72) Inventors: Toshiyuki Hatta, Tokyo (JP); Ryosuke Kawanishi, Tokyo (JP); Koji Shiratsuchi, Tokyo (JP); Kenta Kato, Tokyo (JP); Haruhisa Okuda, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 120 days.

(21) Appl. No.: 17/044,332

(22) PCT Filed: May 31, 2018

(86) PCT No.: PCT/JP2018/021006
§ 371 (c)(1),
(2) Date: Oct. 1, 2020

(87) PCT Pub. No.: WO2019/229943
PCT Pub. Date: Dec. 5, 2019

(65) Prior Publication Data
US 2021/0080925 A1 Mar. 18, 2021

(51) Int. Cl.
*G05B 19/406* (2006.01)

(52) U.S. Cl.
CPC .. *G05B 19/406* (2013.01); *G05B 2219/32293* (2013.01)

(58) Field of Classification Search
CPC ................. G05B 19/406; G06N 5/04
(Continued)

(56) References Cited

U.S. PATENT DOCUMENTS

| 10,768,076 B1* | 9/2020 | Oostendorp ....... G05B 23/0245 |
| 2019/0164110 A1* | 5/2019 | Shiraishi ................ G06N 20/00 |
| 2019/0244112 A1* | 8/2019 | Bowling .............. G06N 3/0454 |

FOREIGN PATENT DOCUMENTS

| DE | 10 2018 129 529 A1 | 5/2019 |
| DE | 10 2017 221 501 A1 | 6/2019 |

(Continued)

OTHER PUBLICATIONS

Liew, Shan Sung, et al. "Gender classification: a convolutional neural network approach." Turkish Journal of Electrical Engineering & Computer Sciences 24.3 (2016): 1248-1264. (Year: 2016).*

(Continued)

*Primary Examiner* — Mohammad Ali
*Assistant Examiner* — Joshua T Sanders
(74) *Attorney, Agent, or Firm* — Xsensus LLP

(57) ABSTRACT

A sensor data input device obtains a plurality of sensor data sequences, each indicating time-series sensor values generated by measuring a work of a working subject using a sensor. A class data generator determines a plurality of intervals obtained by temporally dividing each sensor data sequence based on the sensor values, determines classes of the intervals, each class indicating a type of temporal variations in the sensor values included in one of the intervals, and generates a plurality of first class data sequences for each sensor data sequence, each first class data sequence indicating the intervals and the classes of the sensor data sequence. A class data linker associates the corresponding intervals having an identical class with each other, among the plurality of first class data sequences. A determiner calculates characteristic values of the intervals associated with each other.

11 Claims, 21 Drawing Sheets

(58) Field of Classification Search
USPC .......................................................... 700/111
See application file for complete search history.

(56) References Cited

FOREIGN PATENT DOCUMENTS

| EP | 2172820 | A1 | * | 4/2010 | ........... G05B 13/042 |
|---|---|---|---|---|---|
| JP | 2006-338373 | A | | 12/2006 | |
| JP | 2009-157770 | A | | 7/2009 | |
| JP | 2011-034234 | A | | 2/2011 | |
| JP | 2012-221432 | A | | 11/2012 | |
| JP | 2015-197847 | A | | 11/2015 | |
| JP | 2017-156978 | A | | 9/2017 | |
| JP | 2018019278 | A | * | 2/2018 | |
| WO | WO-2017037839 | A1 | * | 3/2017 | ............... A61B 5/11 |

OTHER PUBLICATIONS

German Office Action dated Nov. 30, 2021, in corresponding German Patent Application No. 11 2018 007 522.2.
International Search Report and Written Opinion dated Aug. 7, 2018, 2018 for PCT/JP2018/021006 filed on May 31, 2018, 8 pages including English Translation of the International Search Report.
Feng, D.F., and Doolittle, RF., "Progressive Sequence Alignment as a Prerequisite to Correct Phylogenetic Trees," Journal of Molecular Evolution, vol. 25, 1987, pp. 351-360.

* cited by examiner

| d | n | $x_d(n)$ | |
|---|---|---|---|
| 1 | 1 | −14.464 | −7.956 |
| | 2 | −10.782 | −1.955 |
| | 3 | 0.134 | 5.995 |
| | ⋮ | ⋮ | ⋮ |
| | 73 | 7.145 | −0.283 |
| 2 | 1 | −14.844 | −1.227 |
| | 2 | −6.903 | 5.173 |
| | 3 | −0.489 | 9.843 |
| | ⋮ | ⋮ | ⋮ |
| | 68 | 2.987 | −1.564 |
| 3 | 1 | −14.569 | −6.557 |
| | 2 | −8.957 | 3.768 |
| | 3 | 0.390 | 9.045 |
| | ⋮ | ⋮ | ⋮ |
| | 63 | 5.355 | −0.445 |
| 4 | 1 | −15.399 | −7.418 |
| | 2 | −13.522 | −1.890 |
| | 3 | −3.436 | 6.020 |
| | ⋮ | ⋮ | ⋮ |
| | 85 | 5.937 | 1.183 |

Fig. 7

| d | m | $s_{d,m}$ | | |
|---|---|---|---|---|
| | | $a_{d,m}$ | $b_{d,m}$ | $c_{d,m}$ |
| 1 | 1 | 1 | 12 | 1 |
| | 2 | 13 | 12 | 2 |
| | 3 | 25 | 12 | 3 |
| | 4 | 37 | 12 | 4 |
| | 5 | 49 | 12 | 5 |
| | 6 | 61 | 13 | 6 |
| 2 | 1 | 1 | 11 | 1 |
| | 2 | 12 | 11 | 2 |
| | 3 | 23 | 12 | 3 |
| | 4 | 35 | 11 | 4 |
| | 5 | 46 | 11 | 5 |
| | 6 | 57 | 12 | 6 |
| 3 | 1 | 1 | 10 | 1 |
| | 2 | 11 | 11 | 2 |
| | 3 | 22 | 10 | 3 |
| | 4 | 32 | 11 | 4 |
| | 5 | 43 | 10 | 5 |
| | 6 | 53 | 11 | 6 |
| 4 | 1 | 1 | 14 | 1 |
| | 2 | 15 | 14 | 2 |
| | 3 | 29 | 14 | 3 |
| | 4 | 43 | 14 | 4 |
| | 5 | 57 | 14 | 5 |
| | 6 | 71 | 15 | 6 |

Fig. 9

| j | i | $g_j(i)$ | |
|---|---|---|---|
| | | $\mu_j(i)$ | $\sigma_j^2(i)$ |
| 1 | 1 | -6.751 | -0.021 | 10.830 |
| | 2 | -5.729 | 1.676 | 10.722 |
| | 3 | -3.031 | 4.225 | 10.718 |
| | ⋮ | ⋮ | ⋮ | ⋮ |
| | 30 | -2.597 | 2.179 | 11.466 |
| 2 | 1 | 0.867 | 12.964 | 10.748 |
| | 2 | 2.059 | 14.854 | 10.666 |
| | 3 | 2.216 | 16.381 | 10.664 |
| | ⋮ | ⋮ | ⋮ | ⋮ |
| | 30 | -0.787 | 11.884 | 11.244 |
| 3 | 1 | -2.711 | 0.207 | 10.797 |
| | 2 | -2.960 | 0.218 | 10.699 |
| | 3 | -3.120 | 0.066 | 10.697 |
| | ⋮ | ⋮ | ⋮ | ⋮ |
| | 30 | -2.236 | -0.089 | 11.374 |
| 4 | 1 | -3.072 | -5.218 | 10.729 |
| | 2 | -2.349 | -5.966 | 10.653 |
| | 3 | -2.618 | -6.651 | 10.651 |
| | ⋮ | ⋮ | ⋮ | ⋮ |
| | 30 | -6.233 | -4.438 | 11.191 |
| 5 | 1 | 8.742 | -7.790 | 10.659 |
| | 2 | 10.557 | -8.269 | 10.602 |
| | 3 | 12.499 | -7.631 | 10.613 |
| | ⋮ | ⋮ | ⋮ | ⋮ |
| | 30 | 9.486 | -6.391 | 11.306 |
| 6 | 1 | 4.570 | -0.649 | 10.819 |
| | 2 | 3.673 | 0.605 | 10.689 |
| | 3 | 3.113 | -0.812 | 10.671 |
| | ⋮ | ⋮ | ⋮ | ⋮ |
| | 30 | 3.205 | -1.910 | 11.270 |

Fig. 11

| d | m | $S_{d,m}$ | | |
|---|---|---|---|---|
| | | $a_{d,m}$ | $b_{d,m}$ | $c_{d,m}$ |
| 1 | 1 | 1 | 6 | 1 |
| | 2 | 7 | 14 | 2 |
| | 3 | 21 | 7 | 3 |
| | 4 | 28 | 22 | 4 |
| | 5 | 50 | 11 | 5 |
| | 6 | 61 | 13 | 6 |
| 2 | 1 | 1 | 5 | 1 |
| | 2 | 6 | 17 | 2 |
| | 3 | 23 | 8 | 3 |
| | 4 | 31 | 17 | 4 |
| | 5 | 48 | 9 | 5 |
| | 6 | 57 | 12 | 6 |
| 3 | 1 | 1 | 5 | 1 |
| | 2 | 6 | 14 | 2 |
| | 3 | 20 | 7 | 3 |
| | 4 | 27 | 16 | 4 |
| | 5 | 43 | 9 | 5 |
| | 6 | 52 | 12 | 6 |
| 4 | 1 | 1 | 5 | 1 |
| | 2 | 6 | 14 | 2 |
| | 3 | 20 | 9 | 3 |
| | 4 | 29 | 9 | 5 |
| | 5 | 38 | 24 | 4 |
| | 6 | 62 | 9 | 5 |
| | 7 | 71 | 15 | 6 |

Fig. 13

| d | m | $s_{d,m}$ | | | $l_{d,m}$ |
|---|---|---|---|---|---|
| | | $a_{d,m}$ | $b_{d,m}$ | $c_{d,m}$ | |
| 1 | 1 | 1 | 6 | 1 | 1 |
| | 2 | 7 | 14 | 2 | 2 |
| | 3 | 21 | 7 | 3 | 3 |
| | 4 | 28 | 22 | 4 | 5 |
| | 5 | 50 | 11 | 5 | 6 |
| | 6 | 61 | 13 | 6 | 7 |
| 2 | 1 | 1 | 5 | 1 | 1 |
| | 2 | 6 | 17 | 2 | 2 |
| | 3 | 23 | 8 | 3 | 3 |
| | 4 | 31 | 17 | 4 | 5 |
| | 5 | 48 | 9 | 5 | 6 |
| | 6 | 57 | 12 | 6 | 7 |
| 3 | 1 | 1 | 5 | 1 | 1 |
| | 2 | 6 | 14 | 2 | 2 |
| | 3 | 20 | 7 | 3 | 3 |
| | 4 | 27 | 16 | 4 | 5 |
| | 5 | 43 | 9 | 5 | 6 |
| | 6 | 52 | 12 | 6 | 7 |
| 4 | 1 | 1 | 5 | 1 | 1 |
| | 2 | 6 | 14 | 2 | 2 |
| | 3 | 20 | 9 | 3 | 3 |
| | 4 | 29 | 9 | 5 | 4 |
| | 5 | 38 | 24 | 4 | 5 |
| | 6 | 62 | 9 | 5 | 6 |
| | 7 | 71 | 15 | 6 | 7 |

Fig. 15

| d | m | $s_{d,m}$ | | | $l_{d,m}$ | $cnt_{d,m}$ | $cv_{d,m}$ | $r_{d,m}$ |
|---|---|---|---|---|---|---|---|---|
| | | $a_{d,m}$ | $b_{d,m}$ | $c_{d,m}$ | | | | |
| 1 | 1 | 1 | 6 | 1 | 1 | 4 | 0.095 | NORMAL |
| 2 | 1 | 1 | 5 | 1 | 1 | 4 | 0.095 | NORMAL |
| 3 | 1 | 1 | 5 | 1 | 1 | 4 | 0.095 | NORMAL |
| 4 | 1 | 1 | 5 | 1 | 1 | 4 | 0.095 | NORMAL |
| 1 | 2 | 7 | 14 | 2 | 2 | 4 | 0.102 | NORMAL |
| 2 | 2 | 6 | 17 | 2 | 2 | 4 | 0.102 | NORMAL |
| 3 | 2 | 6 | 14 | 2 | 2 | 4 | 0.102 | NORMAL |
| 4 | 2 | 6 | 14 | 2 | 2 | 4 | 0.102 | NORMAL |
| 1 | 3 | 21 | 7 | 3 | 3 | 4 | 0.124 | NORMAL |
| 2 | 3 | 23 | 8 | 3 | 3 | 4 | 0.124 | NORMAL |
| 3 | 3 | 20 | 7 | 3 | 3 | 4 | 0.124 | NORMAL |
| 4 | 3 | 20 | 9 | 3 | 3 | 4 | 0.124 | NORMAL |
| 4 | 4 | 29 | 9 | 5 | 4 | 1 | - | IMPROVEMENT TARGET A |
| 1 | 4 | 28 | 22 | 4 | 5 | 4 | 0.196 | IMPROVEMENT TARGET B |
| 2 | 4 | 31 | 17 | 4 | 5 | 4 | 0.196 | IMPROVEMENT TARGET B |
| 3 | 4 | 27 | 16 | 4 | 5 | 4 | 0.196 | IMPROVEMENT TARGET B |
| 4 | 5 | 38 | 24 | 4 | 5 | 4 | 0.196 | IMPROVEMENT TARGET B |
| 1 | 5 | 50 | 11 | 5 | 6 | 4 | 0.105 | NORMAL |
| 2 | 5 | 48 | 9 | 5 | 6 | 4 | 0.105 | NORMAL |
| 3 | 5 | 43 | 9 | 5 | 6 | 4 | 0.105 | NORMAL |
| 4 | 6 | 62 | 9 | 5 | 6 | 4 | 0.105 | NORMAL |
| 1 | 6 | 61 | 13 | 6 | 7 | 4 | 0.109 | NORMAL |
| 2 | 6 | 57 | 12 | 6 | 7 | 4 | 0.109 | NORMAL |
| 3 | 6 | 52 | 12 | 6 | 7 | 4 | 0.109 | NORMAL |
| 4 | 7 | 71 | 15 | 6 | 7 | 4 | 0.109 | NORMAL |

Fig. 21

| d | m | $s_{d,m}$ ||| $l_{d,m}$ |
|---|---|---|---|---|---|
|   |   | $a_{d,m}$ | $b_{d,m}$ | $c_{d,m}$ |   |
| 1 | 1 | 1 | 5 | 1 | 1 |
|   | 2 | 6 | 17 | 2 | 2 |
|   | 3 | 23 | 6 | 3 | 3 |
|   | 4 | 29 | 22 | 4 | 5 |
|   | 5 | 51 | 12 | 5 | 6 |
|   | 6 | 63 | 8 | 6 | 7 |
| 2 | 1 | 1 | 8 | 1 | 1 |
|   | 2 | 9 | 17 | 2 | 2 |
|   | 3 | 26 | 8 | 3 | 3 |
|   | 4 | 34 | 17 | 4 | 5 |
|   | 5 | 51 | 9 | 5 | 6 |
|   | 6 | 60 | 12 | 6 | 7 |
|   | 7 | 72 | 5 | 3 | 8 |
| 3 | 1 | 1 | 5 | 1 | 1 |
|   | 2 | 6 | 14 | 2 | 2 |
|   | 3 | 20 | 7 | 3 | 3 |
|   | 4 | 27 | 18 | 4 | 5 |
|   | 5 | 45 | 7 | 5 | 6 |
|   | 6 | 52 | 16 | 6 | 7 |
| 4 | 1 | 1 | 5 | 1 | 1 |
|   | 2 | 6 | 14 | 2 | 2 |
|   | 3 | 20 | 9 | 3 | 3 |
|   | 4 | 29 | 9 | 5 | 4 |
|   | 5 | 38 | 24 | 4 | 5 |
|   | 6 | 62 | 9 | 5 | 6 |
|   | 7 | 71 | 15 | 6 | 7 |
| 5 | 1 | 1 | 6 | 1 | 1 |
|   | 2 | 7 | 15 | 2 | 2 |
|   | 3 | 22 | 8 | 3 | 3 |
|   | 4 | 30 | 11 | 5 | 4 |
|   | 5 | 41 | 19 | 4 | 5 |
|   | 6 | 60 | 10 | 5 | 6 |
|   | 7 | 70 | 14 | 6 | 7 |

Fig. 23

| d | m | $s_{d,m}$ | | | $l_{d,m}$ | $md_d$ | $cnt2_{d,m}$ | $r2_{d,m}$ |
|---|---|---|---|---|---|---|---|---|
| | | $a_{d,m}$ | $b_{d,m}$ | $c_{d,m}$ | | | | |
| 1 | 1 | 1 | 5 | 1 | 1 | USUAL | 3 | NORMAL |
| 2 | 1 | 1 | 8 | 1 | 1 | USUAL | 3 | NORMAL |
| 3 | 1 | 1 | 5 | 1 | 1 | USUAL | 3 | NORMAL |
| 4 | 1 | 1 | 5 | 1 | 1 | EXCESS | 3 | NORMAL |
| 5 | 1 | 1 | 6 | 1 | 1 | EXCESS | 3 | NORMAL |
| 1 | 2 | 6 | 17 | 2 | 2 | USUAL | 3 | NORMAL |
| 2 | 2 | 9 | 17 | 2 | 2 | USUAL | 3 | NORMAL |
| 3 | 2 | 6 | 14 | 2 | 2 | USUAL | 3 | NORMAL |
| 4 | 2 | 6 | 14 | 2 | 2 | EXCESS | 3 | NORMAL |
| 5 | 2 | 7 | 15 | 2 | 2 | EXCESS | 3 | NORMAL |
| 1 | 3 | 23 | 6 | 3 | 3 | USUAL | 3 | NORMAL |
| 2 | 3 | 26 | 8 | 3 | 3 | USUAL | 3 | NORMAL |
| 3 | 3 | 20 | 7 | 3 | 3 | USUAL | 3 | NORMAL |
| 4 | 3 | 20 | 9 | 3 | 3 | EXCESS | 3 | NORMAL |
| 5 | 3 | 22 | 8 | 3 | 3 | EXCESS | 3 | NORMAL |
| 4 | 4 | 29 | 9 | 5 | 4 | EXCESS | 0 | IMPROVEMENT TARGET C |
| 5 | 4 | 30 | 11 | 5 | 4 | EXCESS | 0 | IMPROVEMENT TARGET C |
| 1 | 4 | 29 | 22 | 4 | 5 | USUAL | 3 | NORMAL |
| 2 | 4 | 34 | 17 | 4 | 5 | USUAL | 3 | NORMAL |
| 3 | 4 | 27 | 18 | 4 | 5 | USUAL | 3 | NORMAL |
| 4 | 5 | 38 | 24 | 4 | 5 | EXCESS | 3 | NORMAL |
| 5 | 5 | 41 | 19 | 4 | 5 | EXCESS | 3 | NORMAL |
| 1 | 5 | 51 | 12 | 5 | 6 | USUAL | 3 | NORMAL |
| 2 | 5 | 51 | 9 | 5 | 6 | USUAL | 3 | NORMAL |
| 3 | 5 | 45 | 7 | 5 | 6 | USUAL | 3 | NORMAL |
| 4 | 6 | 62 | 9 | 5 | 6 | EXCESS | 3 | NORMAL |
| 5 | 6 | 60 | 10 | 5 | 6 | EXCESS | 3 | NORMAL |
| 1 | 6 | 63 | 8 | 6 | 7 | USUAL | 3 | NORMAL |
| 2 | 6 | 60 | 12 | 6 | 7 | USUAL | 3 | NORMAL |
| 3 | 6 | 52 | 16 | 6 | 7 | USUAL | 3 | NORMAL |
| 4 | 7 | 71 | 15 | 6 | 7 | EXCESS | 3 | NORMAL |
| 5 | 7 | 70 | 14 | 6 | 7 | EXCESS | 3 | NORMAL |
| 2 | 7 | 72 | 5 | 3 | 8 | USUAL | 1 | NORMAL |

WORK ANALYSIS APPARATUS FOR ANALYZING WORK INCLUDING SERIES OF ACTIONS PERFORMED BY WORKING SUBJECT

CROSS-REFERENCE TO RELATED APPLICATION

The present application is based on PCT filing PCT/JP2018/021006, filed May 31, 2018, the entire contents of which are incorporated herein by reference.

TECHNICAL FIELD

The present invention relates to a work analysis apparatus for analyzing a work (or operation) including a series of actions performed by a working subject.

BACKGROUND ART

In the manufacturing industry and the like, it is an important issue to improve work processes for higher productivity. To this end, there is an engineering technique, so-called industrial engineering (IE). In order to improve a work process by the IE, at first, it is necessary to measure a required time of the work for analyzing current conditions. In this case, cyclic works repeated by a working subject are to be analyzed, each work including a series of work elements (each work element being an action for a certain purpose). An analyst calculates characteristic values, such as a standard working time of each work element, and variations in the required time among cycles, based on the required times measured for the respective work elements. Thus, the analyst can determine which work element should be improved, and reconstruct a work or improve a production line for higher productivity.

In general, work analysis through measurement of required times is performed using a stopwatch and/or a video camera by an analyst. Since the analyst should measure required times of work elements over a plurality of cycles with his/her eyes, it takes an enormous amount of time and labor. Accordingly, various work analysis apparatuses for reducing a time spent for work analysis have been proposed.

For example, Patent Document 1 discloses a work analysis system for determining a start point and an end point of a work having been performed, based on parameters indicating positional relationship between positions where the work is to be performed, and positions of targets to be detected in the work. The system of Patent Document 1 classifies work elements at various moments, by comparing work position information predefining positions where the work is to be performed (i.e., templates designed in advance), with position information obtained from the positions of the targets to be detected in the work (i.e., sensor data measured from a work of a working subject). In addition, the system of Patent Document 1 calculate working times of the work elements by determining a start time and an end time of each work element. In addition, the system of Patent Document 1 determines whether or not each work element should be improved, by comparing the working time of each work element with a standard working time of each work element, the standard working time being designed in advance.

CITATION LIST

Patent Documents

PATENT DOCUMENT1: Japanese Patent Laid-open Publication No. 2015-197847 A

Non-Patent Documents

NON-PATENT DOCUMENT1: Da-Fei Feng and Russell F. Doolittle, "Progressive sequence alignment as a prerequisite to correct phylogenetic trees", Journal of Molecular Evolution, vol. 25, pp. 351-360, 1987

SUMMARY OF INVENTION

Technical Problem

According to the system of Patent Document 1, it is necessary to design in advance the templates for classifying the work elements at various moment, the standard working times for determining whether or not the work elements should be improved, and the like. That is, since the system of Patent Document 1 cannot be used without knowledge of the templates, the standard working times, and the like, it takes a large amount of time and labor for design in advance. In addition, there is a problem that memory usage increases in order to record the templates, the standard working times, and the like designed in advance. Further, there is a problem that, for example, in a case where the working subject makes an error in the works procedure and repeats or skips a work element, it is not possible to calculate the standard working times, variations, or the like of the work elements, since corresponding work elements among cycles are indefinite.

An object of the present invention is to solve the above problems, and to provide a work analysis apparatus without need to design templates, standard working times, and the like in advance, the work analysis apparatus being capable of calculating characteristic values, such as standard working times and variations of work elements, based only on sensor data measured from a work to be analyzed, even when a working subject has made an error in the works procedure.

Solution to Problem

According to an aspect of the present invention, a work analysis apparatus for analyzing a work including a series of actions performed by a working subject is provided. The work analysis apparatus is provided with: a sensor data input device, a class data generator, a class data linker, and a determiner. The sensor data input device obtains a plurality of sensor data sequences, each of the sensor data sequences indicating time-series sensor values generated by measuring a work of the working subject using a sensor, the sensor data sequences being generated corresponding to repetitions of the work when the working subject repeatedly performs the work a plurality of times. The class data generator determines a plurality of intervals obtained by temporally dividing each of the sensor data sequences based on the sensor values included in the sensor data sequences, determines classes of the intervals, each of the classes indicating a type of temporal variations in the sensor values included in one of the intervals, and generates a plurality of first class data sequences for each of the sensor data sequences, each of the first class data sequences indicating the intervals and the classes of the sensor data sequence. The class data linker associates the intervals having an identical class and corresponding to each other, with each other, among the plurality of first class data sequences, based on the plurality of first class data sequences. The determiner calculates characteristic values of the intervals associated with each other by the class data linker.

Advantageous Effects of Invention

According to the work analysis apparatus of an aspect of the present invention, it is not necessary to design templates, standard working times, and the like, in advance, and it is possible to calculate characteristic values, such as standard working times and variations of the work elements, based only on sensor data measured from the work to be analyzed, even when the working subject has made an error in the work's procedure.

BRIEF DESCRIPTION OF DRAWINGS

FIG. 7 is a diagram for explaining a data structure of class data sequences generated by a first classifier according to the first embodiment of the present invention.

FIG. 9 is a diagram for explaining a data structure of standard patterns generated by a standard pattern generator according to the first embodiment of the present invention.

FIG. 11 is a diagram for explaining a data structure of class data sequences generated by a second classifier according to the first embodiment of the present invention.

FIG. 13 is a diagram for explaining a data structure of link data values generated by a class data linker according to the first embodiment of the present invention.

FIG. 15 is a diagram showing a diagram for explaining a data structure of characteristic values and determination data calculated by a determiner according to the first embodiment of the present invention.

FIG. 21 is a diagram for explaining a data structure of link data values generated by a class data linker according to the second embodiment of the present invention.

FIG. 23 is a diagram for explaining a data structure of characteristic values and determination data calculated by a determiner according to the second embodiment of the present invention.

DESCRIPTION OF EMBODIMENTS

First Embodiment

Figure 1:
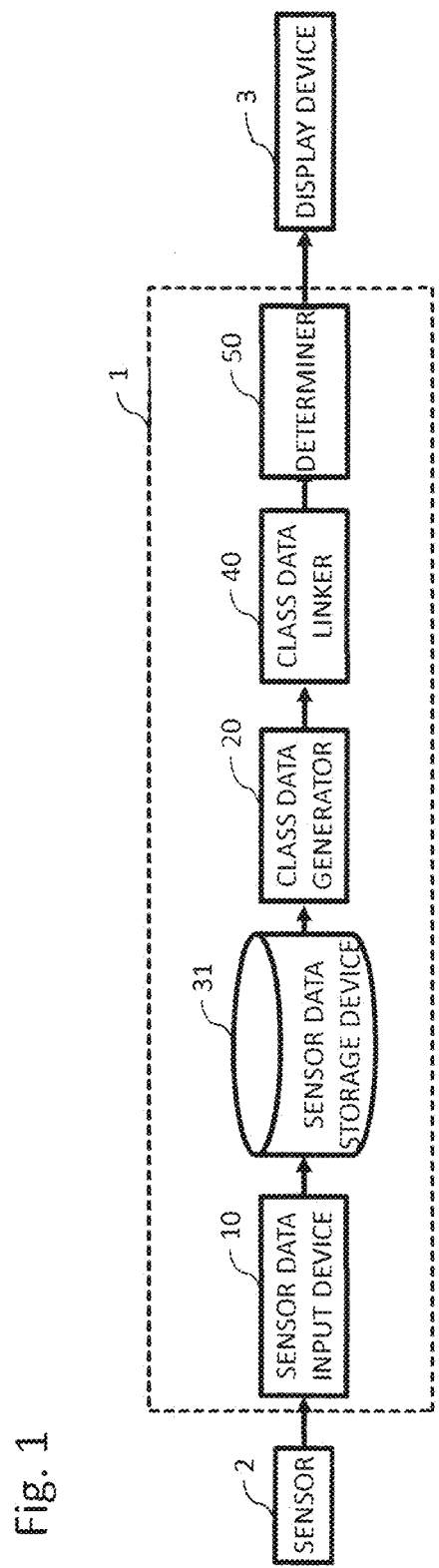
FIG. 1 is a diagram showing an exemplary configuration of a work analysis apparatus according to a first embodiment of the present invention.

FIG. 1 is a diagram showing an exemplary configuration of a work analysis apparatus 1 according to a first embodiment of the present invention. The work analysis apparatus 1 analyzes a work (or operation) including a series of actions performed by a working subject. In the present specification, the working subject may be one or more persons, one or more machines, or a combination thereof. In the present specification, a case in which the working subject is one person will be described. The work analysis apparatus 1 is disposed, for example, on some terminal apparatus in a factory or the like, together with a sensor 2 and a display device 3.

Referring to FIG. 1, the overall configuration of the work analysis apparatus 1 will be described. The work analysis apparatus 1 is provided with: a sensor data input device 10, a sensor data storage device 31, a class data generator 20, a class data linker 40, and a determiner 50. Further, the sensor 2 and the display device 3 are connected to the work analysis apparatus 1. The work analysis apparatus 1 analyzes the work using data measured by the sensor 2, and displays an analyzed result on the display device 3.

Figure 2:
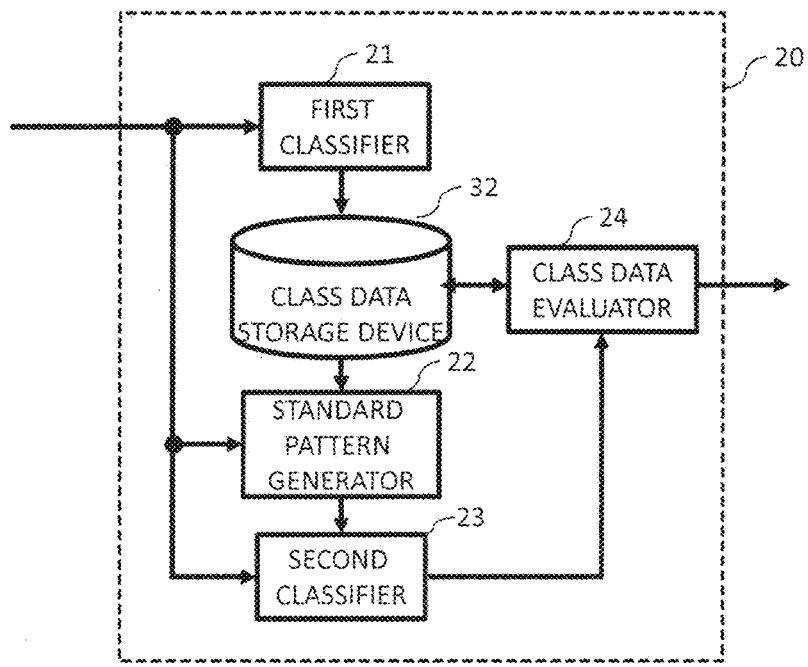
FIG. 2 is a diagram showing an exemplary configuration of a class data generator according to the first embodiment of the present invention.

FIG. 2 is a diagram showing an exemplary configuration of the class data generator 20 according to the present embodiment. The configuration of the class data generator 20 will be described with reference to FIG. 2. The class data generator 20 is provided with: a first classifier 21, a class data storage device 32, a standard pattern generator 22, a second classifier 23, and a class data evaluator 24.

Figure 3:
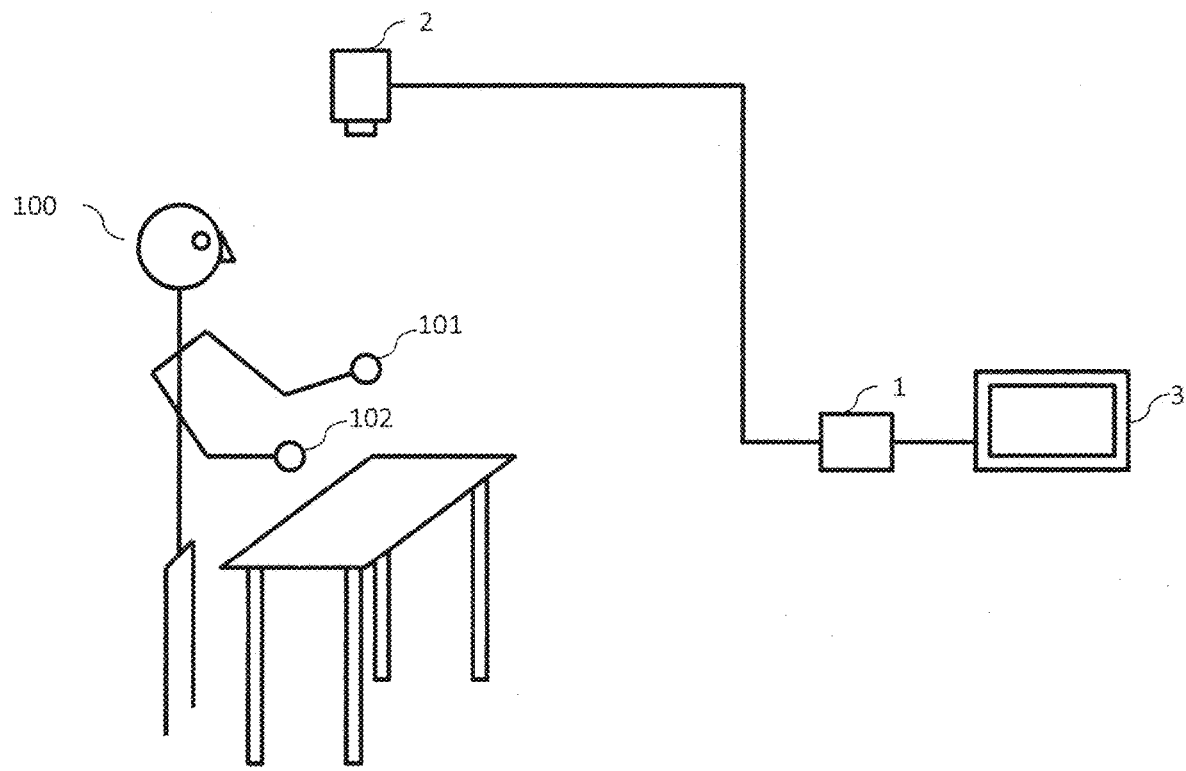
FIG. 3 is a view for explaining an exemplary usage of the work analysis apparatus according to the first embodiment of the present invention.

FIG. 3 is a diagram for explaining an exemplary usage of the work analysis apparatus according to the present embodiment. In the present embodiment, a working subject 100 repeatedly performs cyclic works a plurality of times, each work including a series of actions. The sensor 2 operates in a cycle interval that is a duration from the start to the end of each one cyclic work. The sensor 2 outputs time-series sensor values generated (detected) by measuring the cyclic works in the cycle intervals. The sensor 2 is, for example, a depth sensor, and is disposed so as to take pictures or videos of the cyclic works performed by a left hand 101 and a right hand 102 of the working subject 100. The sensor 2 is provided with, for example, a light source for emitting infrared rays in a predetermined pattern, and an imaging device for receiving infrared rays reflected by an object, and the sensor 2 generates depth image data having a depth to the object as a pixel value. Further, the sensor 2 detects height positions of the left hand 101 and the right hand 102 of the working subject 100 from the depth image data, and outputs the height positions as the sensor values every 200 milliseconds. In particular, the depth sensor may be an existing depth sensor, such as Kinect (registered trademark). For detecting the positions of the hands from the depth image data, the existing processing available for the depth sensor may be used.

Figures 4, 5:
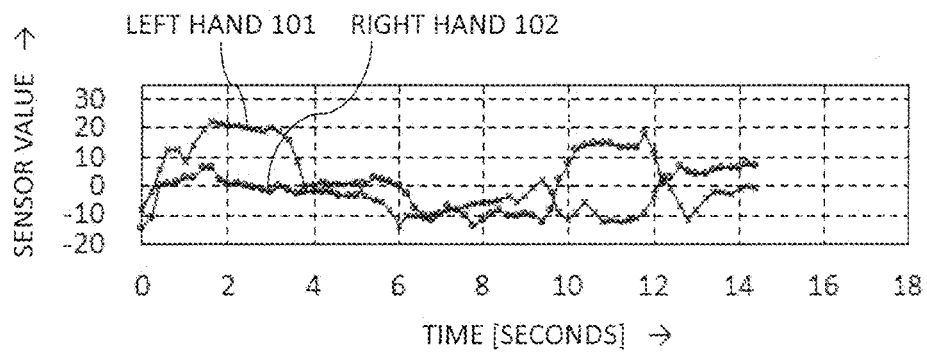
FIG. 4 is a diagram showing an example of sensor values measured by a sensor according to the first embodiment of the present invention.
FIG. 5 is a diagram for explaining a data structure of sensor data sequences stored in a sensor data storage device according to the first embodiment of the present invention.

FIG. 4 is a diagram showing an example of sensor values output by the sensor 2 according to the present embodiment. In FIG. 4, the horizontal axis represents the time when the sensor value is obtained, and the vertical axis represents the sensor values, that is, coordinate values of the height positions of the left hand 101 and the right hand 102 indicated by the sensor values. In the present embodiment, the sensor values are two-dimensional values, including the height positions of the left hand 101 and the right hand 102 of the working subject 100.

In the present embodiment, the case of using the depth sensor as the sensor 2 will be described, but the present invention is not limited thereto, and any sensor may be used so long as measuring a work of a working subject to generate sensor values. Besides the depth sensor, for example, a video camera, a three-dimensional acceleration sensor, a three-dimensional angular velocity sensor, and the like may be used. In addition, in the present embodiment, the positions of the right and left hands of the working subject are to be detected, but the present invention is not limited thereto, and a position of a head of the working subject, angles of joints in a body, or ecological information of the working subject (e.g., heart rate and respiration) may be detected.

Next, the operations of components of the work analysis apparatus 1 according to the present embodiment will be described.

The sensor data input device 10 obtains sensor data sequences $x_d$ each indicating time-series sensor values outputted from the sensor 2 over a plurality of cyclic works. Each sensor data sequence $x_d$ indicates time-series sensor values generated by measuring the cyclic work of the working subject using the sensor 2, and each sensor data sequence $x_d$ is generated corresponding to repetitions of the work when the working subject repeatedly performs the cyclic work a plurality of times.

Where, "d" is a number for identifying a plurality of cyclic works from each other, and it is an integer from 1 to D. "D" is the number of repetitions of the cyclic works. In the present embodiment, the sensor data sequence $x_d$ is: $x_d = \{x_d(1), x_d(2), \ldots, x_d(N(d))\}$. Where, $x_d(n)$ is the n-th outputted sensor value in the cyclic work "d". In addition, N(d) is the number of sensor values outputted in the cycle interval of the cyclic work "d".

For example, when the cycle interval of the cyclic work "d" has the length of 10 seconds, in the present embodiment, the sensor 2 outputs the sensor value every 200 milliseconds as described above, and therefore, the number N(d) of the sensor values is 50.

Figure 6:
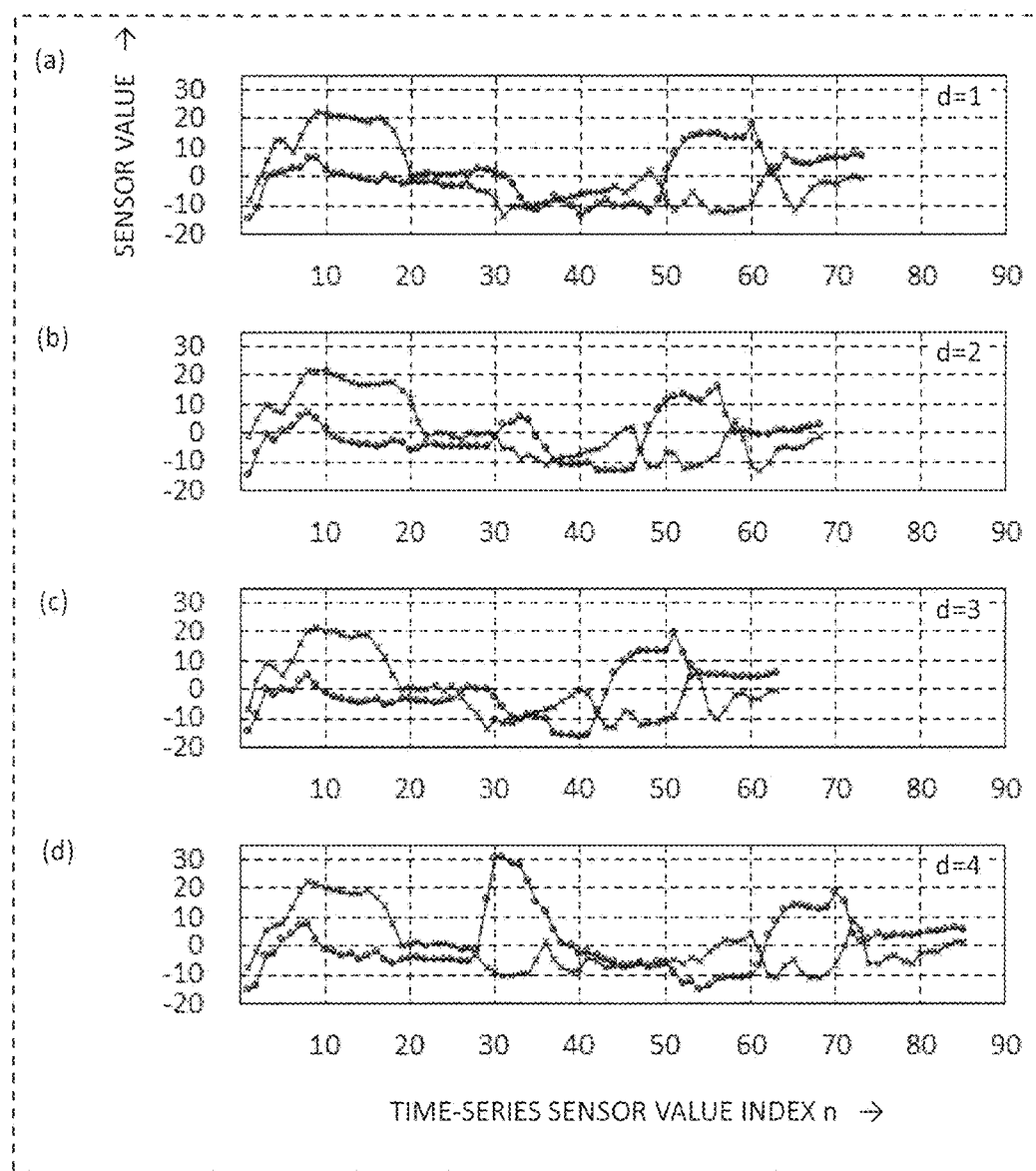
FIG. 6 is a set of time-series graphs showing the sensor data sequences stored in the sensor data storage device according to the first embodiment of the present invention.

Next, the sensor data storage device 31 according to the present embodiment will be described. The sensor data storage device 31 stores a plurality of sensor data sequences obtained by the sensor data input device 10. FIG. 5 is a diagram for explaining a data structure of sensor data sequence stored in the sensor data storage device 31 according to the present embodiment. Referring to FIG. 5, the sensor data storage device 31 stores the sensor data sequences obtained by the cyclic works of D=4. As described above, the number "d" of the cyclic work, in which the sensor data sequence has been obtained, is assigned to each sensor data sequence. In this case, the sensor values are two-dimensional values in the present embodiment, the sensor data storage device 31 stores each sensor value $x_d(n)$ as two values. FIG. 6 is a set of time-series graphs showing the plurality of sensor data sequences shown in FIG. 5. In FIGS. 6(a) to 6(d), the horizontal axis represents the index "n" of the time-series sensor values outputted in the cyclic work "d", and the vertical axis represents the sensor value.

Next, the class data generator 20 according to the present embodiment will be described. The class data generator 20 generates and outputs a plurality of class data sequences $s_d$ corresponding to the plurality of sensor data sequences $x_d$ and satisfying a predetermined evaluation criterion, based on the plurality of sensor data sequences $x_d$ obtained by the sensor data input device 10 in a plurality of cyclic works. More specifically, the class data generator 20 determines a plurality of intervals obtained by temporally dividing each sensor data sequence $x_d$ based on the sensor values included in each sensor data sequence $x_d$, and determines classes of the intervals, each class indicating a type of temporal variations in the sensor values included in one of the intervals. Further, the class data generator 20 generates th plurality of class data sequences $s_d$ for each of the sensor data sequences $x_d$, each class data sequences $s_d$ indicating the intervals and the classes of the sensor data sequence $x_d$.

Similarly to the sensor data sequence $x_d$, in the class data sequence $s_d$, "d" is a number for identifying a plurality of cyclic works from each other, and it is an integer from 1 to D. In this case, the class data sequence: $s_d = \{s_{d, 1}, s_{d, 2}, \ldots, s_{d, m}, \ldots, s_{d, M(d)}\}$. M(d) is the number of intervals obtained by dividing the sensor data sequence $x_d$. "m" is a number for identifying the plurality of divided intervals from each other, and it is an integer from 1 to M(d). $s_{d, m}$ is an element of the class data sequence in the m-th interval obtained by dividing the sensor data sequence $x_d$, and $s_{d, m} = \{a_{d, m}, b_{d, m}, c_{d, m}\}$. $a_{d, m}$ is the starting number of the m-th interval obtained by dividing the sensor data sequence $x_d$, $b_{d, m}$ is the length of the m-th interval obtained by dividing the sensor data sequence $x_d$, and $c_{d, m}$ is a class number classifying the m-th interval obtained by dividing the sensor data sequence $x_d$. By using the class data sequence $s_{d, m} = \{a_{d, m}, b_{d, m}, c_{d, m}\}$, for example, the time-series sensor value $x_{d, m}$ included in the m-th interval obtained by dividing the sensor data sequence $x_d$ can be expressed as: $x_{d, m} = \{x_d(a_{d, m}), x_d(a_{d, m}+1), \ldots, x_d(a_{d, m}+b_{d, m}-1)\}$. That is, the sensor data sequence $x_d$ is: $x_d = \{x_{d, 1}, x_{d, 2}, \ldots, x_{d, M(d)}\}$, the start number of the first interval obtained by dividing the sensor data sequence $x_d$ is: $a_{d, 1} = 1$, and the start number of the last interval obtained by dividing the sensor data sequence $x_d$ is: $a_{d, M(d)} = N(d) - b_{d, M(d)} + 1$.

As described above, the class data generator 20 according to the present embodiment is provided with: the first classifier 21, the class data storage device 32, the standard pattern generator 22, the second classifier 23, and the class data evaluator 24. Next, the components of the class data generator 20 will be described.

First, the first classifier 21 according to the present embodiment will be described. The first classifier 21 calculates the initial value of the class data sequence $s_d$ for each of the sensor data sequences $x_d$, and stores it into the class data storage device 32. Specifically, the first classifier 21 divides each of the sensor data sequences $x_d$ into a plurality of intervals, the number of which is equal to the number of classes J, and which have lengths as equal as possible to each other. That is, the number of intervals obtained by dividing the sensor data sequence $x_d$ is M(d)=J. In addition, the first classifier 21 classifies, for each of the sensor data sequences $x_d$, a plurality of intervals obtained by dividing the sensor data sequence $x_d$ to the plurality of classes based on a temporal order of the intervals. For example, a class with a class number $c_{d, m}$=m is assigned to the m-th divided interval. Therefore, in the present embodiment, the first classifier 21 generates the initial values of the class data sequences with these intervals and classes.

Figure 8:
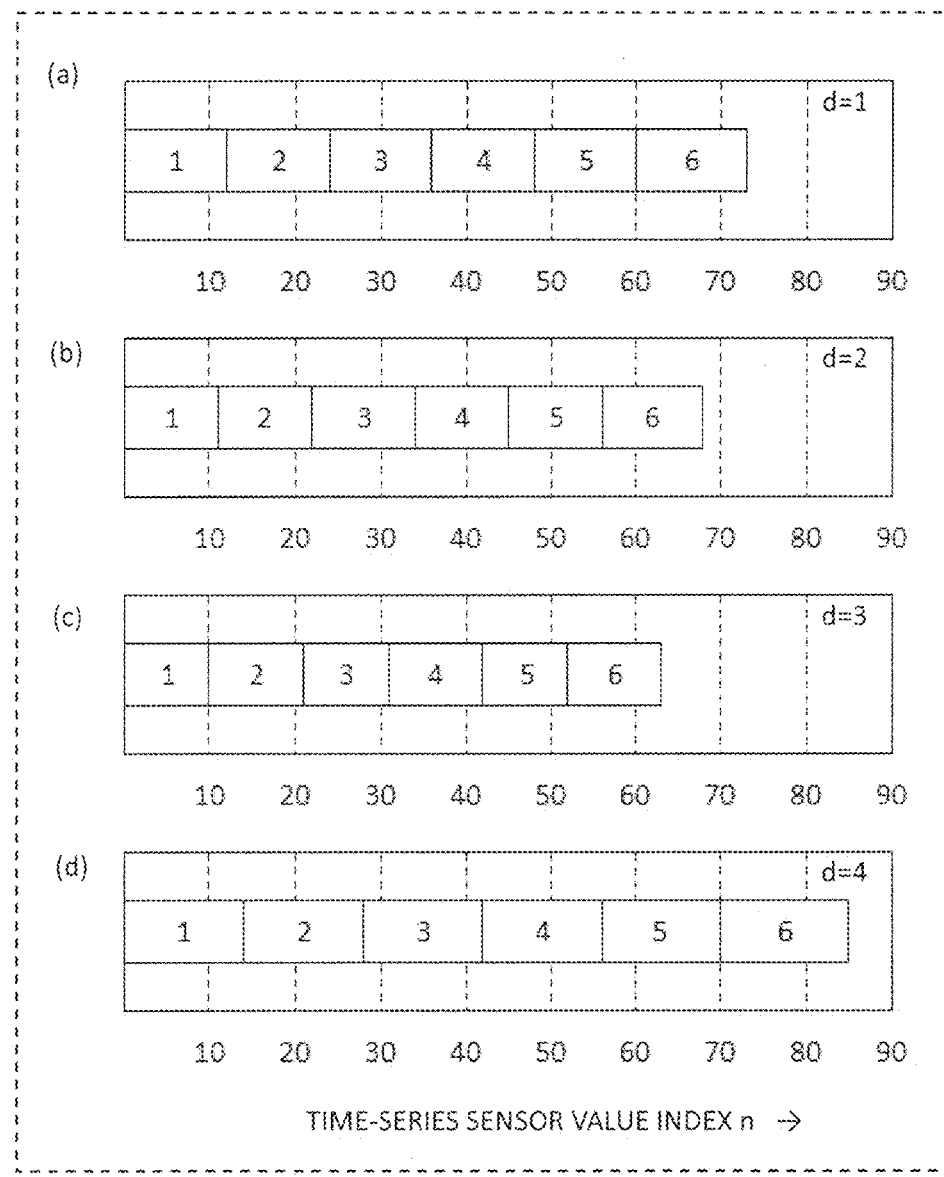
FIG. 8 is a set of time-series graphs showing the class data sequences generated by the first classifier according to the first embodiment of the present invention.

FIG. 7 is a diagram for explaining a data structure of class data sequences generated by the first classifier 21 according to the present embodiment. FIG. 7 shows initial values of the class data sequences generated based on the sensor data sequences obtained by the cyclic works of D=4. In addition, the number of classes J=6, and each sensor data sequence $x_d$ is divided into six intervals each having lengths as equal as possible to each other. FIG. 8 is a set of time-series graphs showing the class data sequences shown in FIG. 7. In FIGS. 8(a) to 8(d), the horizontal axis represents the index "n" of the time-series sensor values outputted in the cyclic work "d" in a manner similar to that of FIG. 6, and rectangles including numerals "1" to "6" represent intervals $[a_{d, m}, a_{d, m}+b_{d, m}-1]$ obtained by dividing the sensor data sequence $x_d$. In addition, the numbers "1" to "6" described in each interval represent the class number $c_{d, m}$ classifying the intervals. The first classifier 21 has divided the sensor data sequence $x_d$ into six intervals having lengths as equal as possible to each other, and therefore, the graphs of stages (a) to (d) include six rectangles. In addition, a class of a class number $c_{d, m}$=m is assigned to the m-th divided interval, and therefore, the class numbers described in the intervals are "1", "2", . . . , and "6" in order.

By generating the initial values of the class data sequences in this manner, the first classifier 21 can accurately estimate the class data sequences, and converge the estimation processing in a short time.

Next, the standard pattern generator 22 according to the present embodiment will be described. Each of standard patterns indicates standard temporal variations in the sensor values included in each interval, and corresponds to one of the plurality of classes. The standard pattern generator 22 generates the plurality of standard patterns $g_j$ corresponding to a plurality of classes "j", based on the plurality of sensor data sequences $x_d$, and based on the plurality of class data sequences $s_d$ stored in the class data storage device 32. Where, "j" is a number for identifying a plurality of classes from each other, and it is an integer from 1 to J. "J" is the number of classes described above, that is, the number of standard patterns.

In the present embodiment, the standard pattern generator 22 uses Gaussian process regression to generate the standard pattern $g_j$ as a set of Gaussian distributions of the sensor values at each moment. In this case, the standard pattern $g_j$ is obtained as a parameter of the Gaussian distribution of the sensor values in the interval classified to a class "j". The standard pattern: $g_j=\{g_j(1), g_j(2), \ldots, g_j(L)\}$. $g_j(i)$ is a parameter of the Gaussian distribution of the i-th sensor value in the interval classified to the class "j", and $g_j(i)=\{\mu_j(i), \sigma_j^2(i)\}$. Where, $\mu_j(i)$ is a mean of the Gaussian distribution, and $\sigma_j^2(i)$ is a variance of the Gaussian distribution. In addition, "L" is the length of the standard patterns, that is, "L" represents the maximum number of sensor values included in the intervals obtained by dividing the sensor data sequence.

The standard patterns $g_j$ according to the present embodiment will be described more specifically. As described above, $\mu_j(i)$ is the mean of the Gaussian distribution of the i-th sensor value in the interval classified to the class "j". $\mu_j(i)$ is a two-dimensional value similarly to the sensor value. In addition, $\sigma_j^2(i)$ is the variance of the Gaussian distribution of the i-th sensor value in the interval classified to the class "j". In the present embodiment, it is assumed that the variance of the Gaussian distribution of the sensor values is the same in both bases, and therefore, $\sigma_j^2(i)$ is a one-dimensional value.

The standard pattern $g_j$ can be estimated using a set $X_j$ of the sensor values in the interval classified to the class "j" by the class data sequence, and using a set $I_j$ of the numbers of moments when outputting the sensor values in the interval classified to the class "j" by the class data sequence. Where, $X_j=\{X_j(1), X_j(2), \ldots, X_j(N2_j)\}$ and $I_j=\{I_j(1), I_j(2), \ldots, I_j(N2_j)\}$. For example, $X_j(1)$ is the $I_j(1)$-th outputted sensor value in the interval classified to the class "j". In addition, $N2_j$ is the number of elements included in the sets $x_j$ and $I_j$. In other words, $N2_j$ is the sum of the number of sensor values included in the intervals classified to the class "j", among the intervals obtained by dividing the "D" sensor data sequences. In the present embodiment, the standard pattern $g_j(i)=\{\mu_j(i), \sigma_j^2(i)\}$ is estimated by Mathematical Expressions (1) and (2). Where, β is a parameter, and E is a unit matrix. In addition, $K_j$ is a matrix calculated using Mathematical Expression (3), and $v_{j, i}$ is a vector calculated using Mathematical Expression (4). In addition, "k" is a kernel function, and the Gaussian kernel of Mathematical Expression (5) can be used. $\theta_0$, $\theta_1$, $\theta_2$, and $\theta_3$ are parameters for the kernel function "k".

$$\mu_j(i)=v_{j,i}^T(K_j+\beta^{-1}E)^{-1}X_j \quad \text{[Mathematical Expression 1]}$$

$$\sigma_j^2(i)=(k(i,i)+\beta^{-1})-v_{j,i}^T(K_j+\beta^{-1}E)^{-1}v_{j,i} \quad \text{[Mathematical Expression 2]}$$

[Mathematical Expression 3]

$$K_j = \begin{bmatrix} k(I_j(1), I_j(1)) & k(I_j(1), I_j(2)) & \cdots & k(I_j(1), I_j(N2_j)) \\ k(I_j(2), I_j(1)) & k(I_j(2), I_j(2)) & \cdots & k(I_j(2), I_j(N2_j)) \\ \vdots & \vdots & \ddots & \vdots \\ k(I_j(N2_j), I_j(1)) & k(I_j(N2_j), I_j(2)) & \cdots & k(I_j(N2_j), I_j(N2_j)) \end{bmatrix}$$

[Mathematical Expression 4]

$$v_{j,i} = \begin{bmatrix} k(i, I_j(1)) \\ k(i, I_j(2)) \\ \vdots \\ k(i, I_j(N2_j)) \end{bmatrix}$$

[Mathematical Expression 5]

$$k(i_p, i_q) = \theta_0 \exp\left(-\frac{\theta_1}{2}|i_p - i_q|^2\right) + \theta_2 + \theta_3 i_p i_q$$

Figure 10:
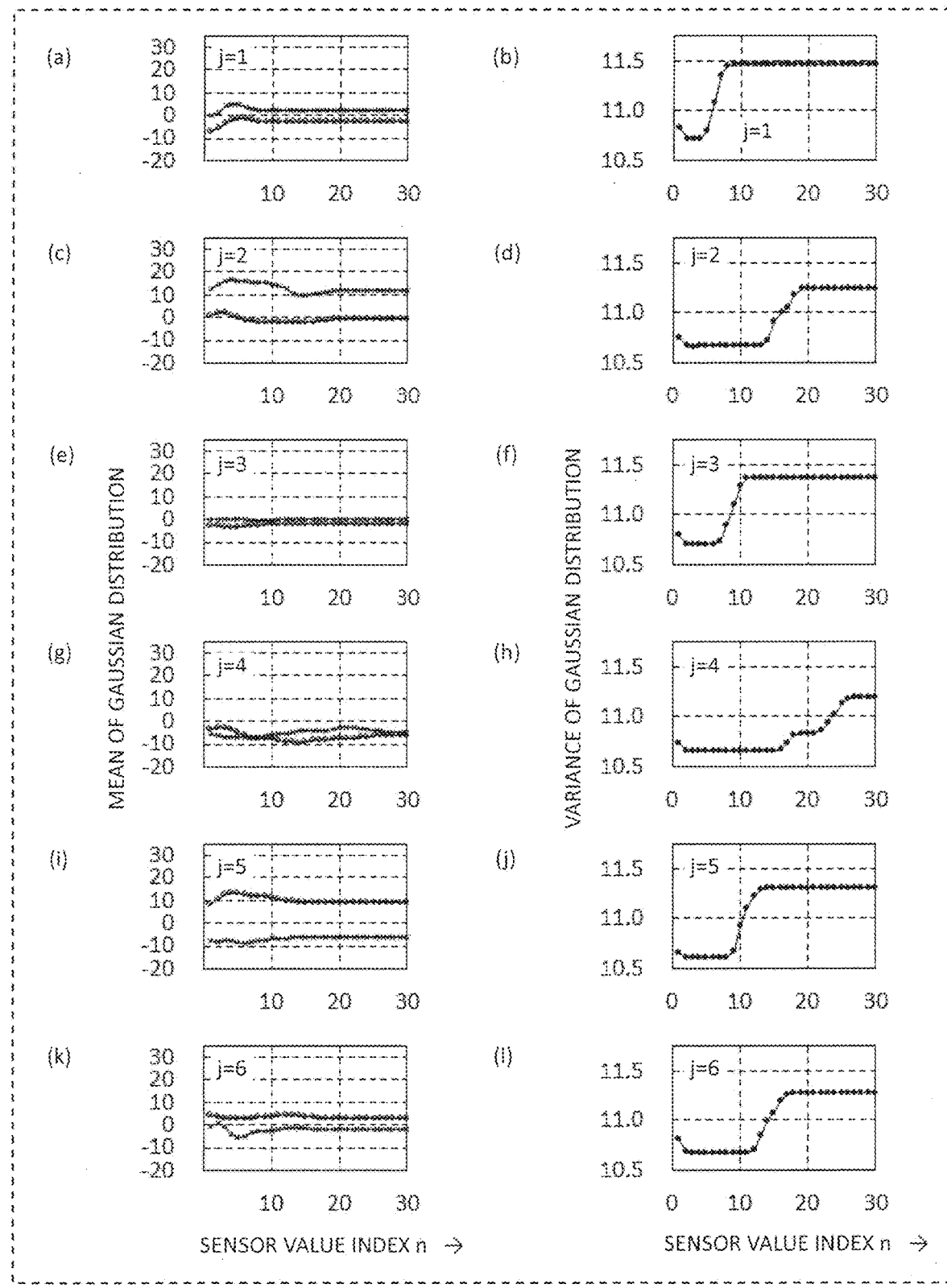
FIG. 10 is a set of time-series graphs showing the standard patterns generated by the standard pattern generator according to the first embodiment of the present invention.

FIG. 9 is a diagram for explaining a data structure of standard patterns generated by the standard pattern generator 22 according to the present embodiment. In the example of FIG. 9, the number of classes J=6. As described above, "j" is a number for identifying the classes from each other. In addition, in the example of FIG. 9, the length L of the standard pattern is 30. FIG. 10 is a set of time-series graphs showing the standard patterns of FIG. 9. In FIGS. 10(a) to 10(l), the horizontal axis represents the index "i" of the sensor values in the interval classified to each class "j". The vertical axis represents the mean and variance of the Gaussian distribution of the sensor values in the interval classified to the class "j". As described above, the mean of the Gaussian distribution is a two-dimensional value similarly to the sensor value. In addition, it is assumed that the variance of the Gaussian distribution is the same in both bases, and it is a one-dimensional value.

By generating standard patterns having a predetermined variance, it is possible to accurately estimate the class data sequences.

Next, the second classifier 23 according to the present embodiment will be described. The second classifier 23 generates a class data sequence $s_d$ for each of the sensor data sequences $x_d$, using the plurality of standard patterns $g_j$ generated by the standard pattern generator 22. In the present embodiment, by using forward filtering-backward sampling (FF-BS), the sensor data sequence is divided into a plurality of intervals, and the time-series sensor values in each of the divided intervals are classified to a plurality of classes. The FF-BS is made of two steps: FF step including probability calculation, and BS step including dividing and classifying.

First, the FF step will be described. In the FF step, $P(x_d(n)|X_j, I_j)$ is calculated using Mathematical Expression (6) as the Gaussian distribution "Normal". $P(x_d(n)|X_j, I_j)$ denotes a probability that the n-th sensor value $x_d(n)$ in the sensor data sequence $x_d$ is generated from the i-th Gaussian distribution $g_j(i)$ of the standard pattern corresponding to the class "j". Further, when the n-th interval is further divided from the sensor data sequence $x_d$ from which the first to (n-i)-th intervals have already been divided, the probability $a_d[n][i][j]$ that the class of the n-th interval is "j" is calculated using Mathematical Expression (7). Where, P(j|j') is a class transition probability calculated using Mathematical Expression (8). In addition, $N3_{j',j}$ is the number of times that the m-th interval obtained by dividing the sensor data sequence is classified to a class j', and the (m+1)-th interval is classified to the class "j", in all the sensor data sequences. In addition, $N4_{j'}$ is the number of times that the classes "j" are obtained by classifying the intervals obtained by dividing the sensor data sequence. "γ" is a parameter. Mathematical Expression (7) is a recurrence formula, and the probability $a_d[n][i][j]$ can be calculated in order from n=1 to n=N(d).

[Mathematical Expression 6]

$$P(x_d(n) | X_j, I_j) \propto \text{Normal}(\mu_j(i), \sigma_j^2(i))$$

[Mathematical Expression 7]

$$\alpha_d[n][i][j] = P(x_d(n-i), x_d(n-i+1), \ldots, x_d(n) | X_j, I_j) \times \sum_{i'=1}^{L} \sum_{j'=1}^{J} P(j|j') \alpha_d[n-i][i'][j']$$

[Mathematical Expression 8]

$$P(j | j') = (N3_{j',j} + \gamma) / (N4_{j'} + J\gamma)$$

Next, the BS step will be described. In the BS step, the class data sequence is sampled using Mathematical Expression (9) on the intervals obtained by dividing the sensor data sequence $x_d$. In Mathematical Expression (9), $b_{d, m'}$ and $c_{d, m'}$ in the first line are random variables obtained from the probability distribution on the right side, and the second line is a recurrence formula of a variable $a_{d, m'}$. According to Mathematical Expression (9), class data sequences $s_{d, m'} = \{a_{d, m'}, b_{d, m'}, c_{d, m'}\}$ can be generated in order from m'=1 to m'=M2(d). Where, M2(d) is the number of intervals obtained by dividing the sensor data sequence $x_d$ using Mathematical Expression (9). In addition, $s_{d'}$ is the class data sequence in the m'-th interval from the last, among the intervals obtained by dividing the sensor data sequence $x_d$. In Mathematical Expression (9), the class data sequences in the intervals obtained by dividing the sensor data sequence $x_d$ are calculated in order from the last of the sensor data sequence $x_d$. That is, the class data sequence $s_{d, m}$ is: $s_{d, m} = \{a_{d, m}, b_{d, m}, c_{d, m}\} = \{a_{d, M2(d)-m+1}, b_{d, M2(d)-m+1}, c_{d, M2(d)-m+1}\}$ in the m-th interval obtained by dividing the sensor data sequence $x_d$.

[Mathematical Expression 9]

$$\begin{cases} b_{d,m'}, c_{d,m'} \sim \alpha_d[N(d) - a_{d,m'-1}][b_{d,m'}][c_{d,m'}] \\ a_{d,m'} = N(d) - a_{d,m'-1} - b_{d,m'} + 1 \end{cases}$$

Figure 12:
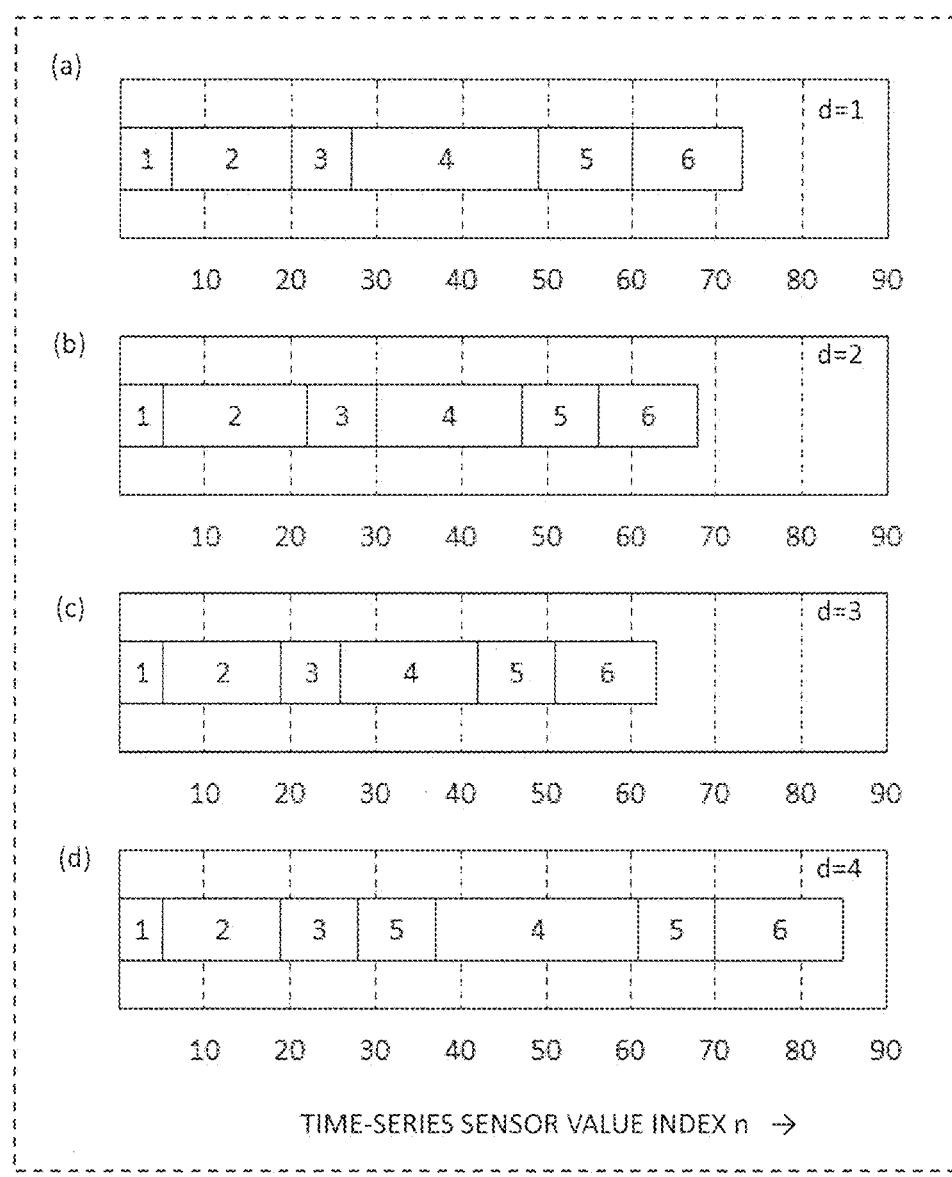
FIG. 12 is a set of time-series graphs showing the class data sequences generated by the second classifier according to the first embodiment of the present invention.

FIG. 11 is a diagram for explaining a data structure of class data sequence generated by the second classifier 23 according to the present embodiment. FIG. 11 shows class data sequences generated based on a plurality of standard patterns from the sensor data sequences obtained by the cyclic works of D=4. In addition, the number of classes J=6. FIG. 12 is a set of time-series graphs showing the class data sequences shown in FIG. 11. In FIGS. 12(a) to 12(d), the horizontal axis represents the index "n" of the time-series sensor values outputted in the cyclic work "d" in a manner similar to that of FIG. 6, and rectangles including numerals "1" to "6" represent intervals $[a_{d, m}, a_{d, m}+b_{d, m}-1]$ obtained by dividing the sensor data sequence $x_d$. In addition, the numbers "1" to "6" described in each interval represent the class number $c_{d, m}$ classifying the intervals. In the example of FIG. 12, the ranges of the intervals are updated from their initial values of the class data sequences generated by the first classifier 21 (see FIGS. 7 and 8). For example, the sensor data sequence $x_4$ is divided into intervals of M2(4)=7. In addition, the classes of the intervals have also been updated from their initial values.

Next, the class data evaluator 24 according to the present embodiment will be described. The class data evaluator 24 evaluates the class data sequences generated by the second classifier 23, based on a predetermined evaluation criterion. When the class data sequences generated by the second classifier 23 do not satisfy the evaluation criterion, the class data evaluator 24 updates the class data sequences stored in the class data storage device 32, with the class data sequences generated by the second classifier 23. On the other hand, when the class data sequences generated by the second classifier 23 satisfy the evaluation criterion, the class data evaluator 24 outputs the class data sequences generated by the second classifier 23, to the class data linker 40 to be described later.

In the present embodiment, for example, the class data evaluator 24 compares the class data sequences stored in the class data storage device 32, with the class data sequences generated by the second classifier 23, and calculates the degree of similarity indicating a ratio at which the values of the classes at respective moments match between these class data sequences. In this case, when the degree of similarity is higher than a predetermined threshold (e.g., 90%), the class data evaluator 24 may determine that the class data sequences generated by the second classifier 23 satisfy the evaluation criterion. Alternatively, when the number of evaluations performed by the class data evaluator 24 exceeds a predetermined threshold, the class data evaluator 24 may determine that the class data sequences generated by the second classifier 23 satisfy the evaluation criterion.

As described above, the class data generator 20 repeats generating the standard patterns by the standard pattern generator 22, generating the class data sequences by the second classifier 23, and updating the class data sequences stored in the class data storage device 32 by the class data evaluator, until the class data sequences generated by the second classifier 23 satisfy the evaluation criterion. When the class data sequences generated by the second classifier 23 satisfy the evaluation criterion, the class data generator 20 outputs the class data sequences and ends its operation.

The class data generator 20 can end iterations at an appropriate number of times, and reduce the processing time, by using the above-mentioned evaluation criterion (the degree of similarity or the number of evaluations).

In other words, the class data generator 20 performs machine learning using the sensor data sequences, generates the standard patterns so as to satisfy the evaluation criterion, and generates the class data sequences using the generated standard patterns.

The class data sequences outputted from the class data generator 20 are referred to as "first class data sequences". In addition, the class data sequences stored in the class data storage device 32 are referred to as "second class data sequences". The class data sequences generated by the second classifier 23 are referred to as "third class data sequences".

Next, the class data linker 40 according to the present embodiment will be described. The class data linker 40 generates link data values by which the intervals having an identical class and corresponding to each other are associated with each other among the plurality of class data sequences, based on the plurality of class data sequences generated by the class data generator 20. The class data linker 40 generates link data values, for example, using a multi-dimensional elastic matching technique such as multi-sequence alignment (e.g., see Non-Patent Document 1), on the plurality of class number sequences $\{c_{1,1}, c_{1,2}, \ldots, c_{1,M2(1)}\}$, $\{c_{2,1}, c_{2,2}, \ldots, c_{2,M2(2)}\}$, $\ldots$, $\{c_{D,1}, c_{D,2}, \ldots, c_{D, M2(D)}\}$. That is, the class data linker 40 associates the corresponding intervals with each other, based on the order of the intervals in each cyclic work, and based on the classified classes.

Figure 14:
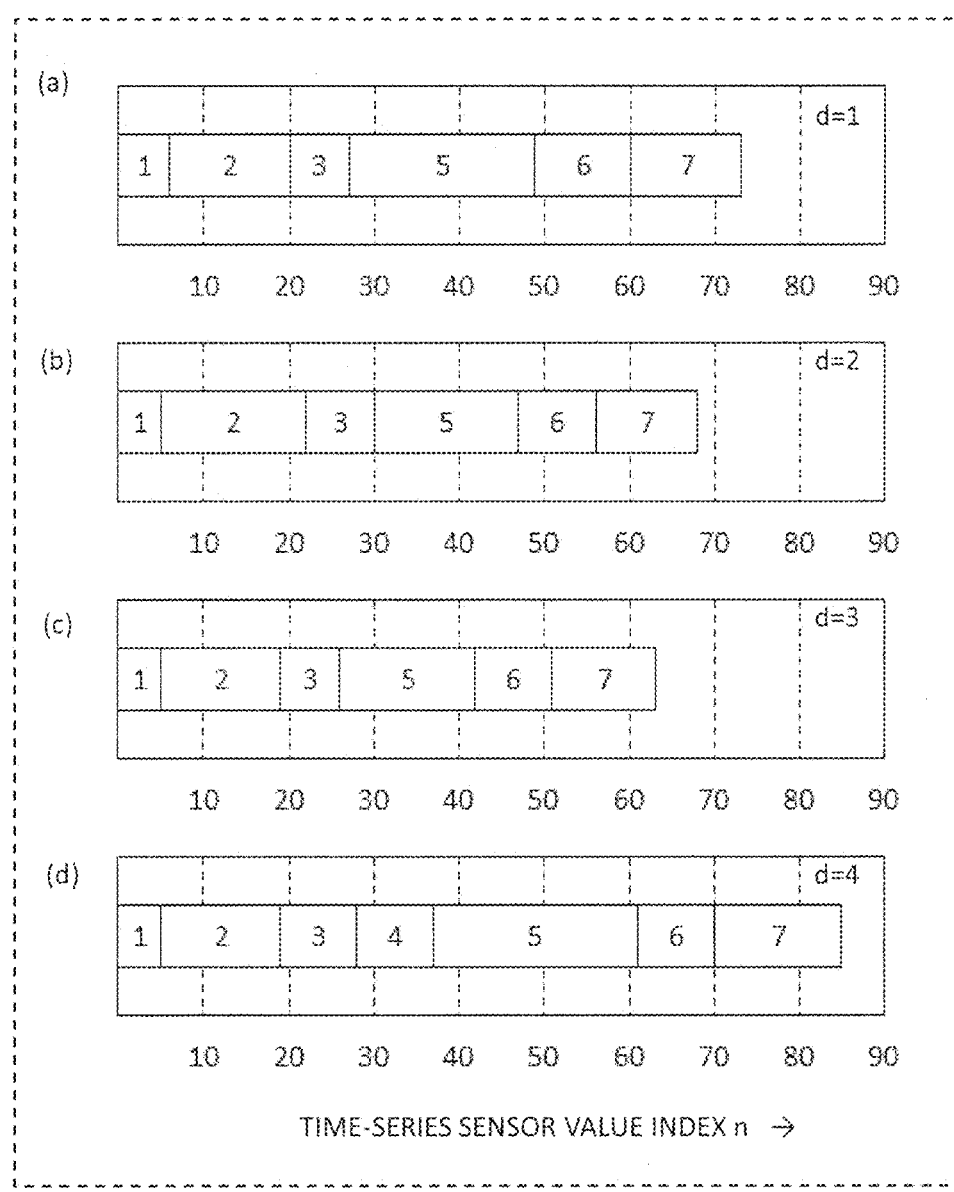
FIG. 14 is a set of time-series graphs showing the link data values generated by the class data linker according to the first embodiment of the present invention.

FIG. 13 is a diagram for explaining a data structure of link data values generated by the class data linker according to the present embodiment. FIG. 13 shows the class data sequences $s_{d, m}$ generated by the second classifier 23 shown in FIG. 11, and link data values $l_{d, m}$ generated by the class data linker 40, side by side. In addition, FIG. 14 is a set of time-series graphs showing the link data values shown in FIG. 13. In FIGS. 14(a) to 14(d), the horizontal axis represents the index "n" of the time-series sensor values outputted in the cyclic work "d" in a manner similar to that of FIG. 6, and rectangles including numerals "1" to "7" represent intervals $[a_{d, m}, a_{d, m}+b_{d, m}-1]$ obtained by dividing the sensor data sequence $x_d$. In addition, numerals "1" to "7" described in each interval represent the link data value $l_{d, m}$.

Next, the determiner 50 according to the present embodiment will be described. The determiner 50 calculates characteristic values of the intervals, for each set of intervals associated with each other by the link data value (i.e., intervals having an identical link data value). The determiner 50 calculates, as the characteristic values of the intervals, count values $cnt_{d, m}$ indicating the number of intervals associated with each other by the link data value, and variation coefficients $cv_{d, m}$ indicating the variations of the lengths of the intervals. The variation coefficient $cv_{d, m}$ can be calculated, for example, by dividing a standard deviation of a set of lengths of intervals to which the identical link data value is assigned, by a mean of the lengths of these intervals. Further, the determiner 50 can calculate determination data indicating a result of determining whether or not the actions of the working subject in each interval should be improved, based on the characteristic values calculated for each set of the intervals associated with each other. The determiner 50 calculates the determination data $r_{d, m}$ using Mathematical Expression (10) based on the count values $cnt_{d, m}$ and the variation coefficients $cv_{d, m}$. Where, $cnt_{th}$ and $cv_{th}$ are predetermined thresholds.

[Mathematical Expression 10]

$$r_{d,m} = \begin{cases} \text{Improvement target } A \ (cnt_{d,m} < cnt_{th}) \\ \text{Improvement target } B \ (cnt_{d,m} \geq cnt_{th} \text{ and } cv_{d,m} > cv_{th}) \\ \text{Normal (Otherwise)} \end{cases}$$

In this case, the improvement target A is a label for intervals determined such that a small number of intervals are associated with each other over the plurality of cyclic works, that is, intervals in which non-steady actions are performed in the series of actions. In addition, the improvement target B is a label for intervals determined such that the lengths of intervals associated with each other are not constant over the plurality of cyclic works, that is, intervals in which works cannot be performed stably. When there is an interval having a count value lower than the threshold $cnt_{th}$, the determiner 50 determines that the actions of the working subject in the interval should be improved. In addition, when there is an interval having a variation coefficient higher than the threshold $cv_{th}$, the determiner 50 determines that the actions of the working subject in the interval should be improved.

FIG. 15 is a diagram showing a diagram for explaining a data structure of characteristic values and determination data calculated by the determiner 50 according to the present embodiment. Referring to FIG. 15, the class data sequences $s_{d, m}$ generated by the second classifier 23, the link data values $l_{d, m}$ calculated by the class data linker 40, the count values $cnt_{d, m}$ and the variation coefficient $cv_{d, m}$, which are the characteristic values calculated by the determiner 50, and the determination data $r_{d, m}$ are shown in an ordered manner based on the link data values $l_{d, m}$. In the example of FIG. 15, the determiner 50 sets the thresholds $cnt_{th}=2$ and $cv_{th}=0.15$ in Mathematical Expression (10) to determine whether or not the actions of the working subject should be improved.

Referring to FIG. 15, for example, since only one link data value $l_{4,\,4}$ has the value "4", the count values of the intervals associated by the link data value "4" is $cnt_{4,\,4}=1<cnt_{th}$. Therefore, the determiner 50 calculates the determination data $r_{4,\,4}=$"improvement target A" using Mathematical Expression (10).

In addition, since the four link data values $\{l_{1,\,4}, l_{2,\,4}, l_{3,\,4}, l_{4,\,5}\}$ have the value "5", the count values of the intervals associated by the link data value "4" is $cnt_{1,\,4}=cnt_{2,\,4}=cnt_{3,\,4}=cnt_{4,\,4}=4>cnt_{th}$. In addition, the lengths of the intervals associated by the link data value "4" are $\{b_{1,\,4}, b_{2,\,4}, b_{3,\,4}, b_{4,\,5}\}=\{22, 17, 16, 24\}$, and has an mean of 19.750 and a standard deviation of 3.862, and therefore, its variation coefficient is $cv_{1,\,4}=cv_{2,\,4}=cv_{3,\,4}=cv_{4,\,5}=0.196>cv_{th}$. Therefore, the determiner 50 calculates determination data $r_{1,\,4}, r_{2,\,4}, r_{3,\,4}, r_{4,\,5}=$"improvement target B" using Mathematical Expression (10).

In addition, since the four link data values $\{l_{1,\,1}, l_{2,\,1}, l_{3,\,1}, l_{4,\,1}\}$ have the value "1", the count values of the intervals associated by the link data value "1" are $cnt_{1,\,1}=cnt_{2,\,1}=cnt_{3,\,1}=cnt_{4,\,1}=4>cnt_{th}$. In addition, since the lengths of the intervals associated by the link data value "1" are $\{b_{1,\,1}, b_{2,\,1}, b_{3,\,1}, b_{4,\,1}\}=\{6, 5, 5, 5\}$, and has a mean of 5.25 and a standard deviation of 0.5, and therefore, its variation coefficient is $cv_{1,\,1}=cv_{2,\,1}=cv_{3,\,1}=cv_{4,\,1}=0.095<cv_{th}$. Therefore, the determiner 50 calculates the determination data $r_{1,\,1}, r_{2,\,1}, r_{3,\,1}, r_{4,\,1}=$"normal" using Mathematical Expression (10).

Figure 16:
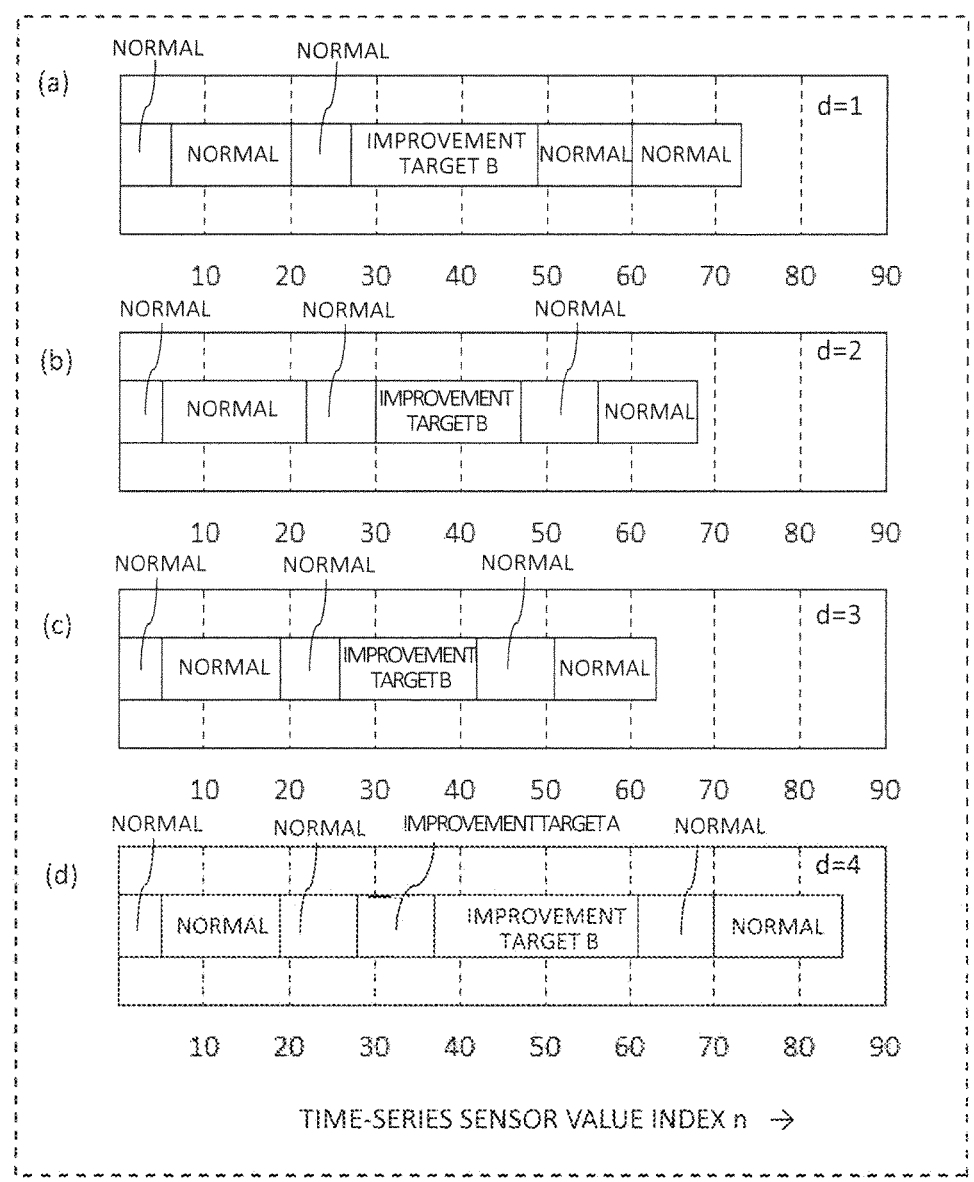
FIG. 16 is a set of time-series graphs showing the determination data calculated by the determiner according to the first embodiment of the present invention.

FIG. 16 is a set of time-series graphs showing the determination data shown in FIG. 15. FIG. 16 shows the contents of the determination data $r_{d,\,m}$, instead of the corresponding numbers "1" to "7" representing the link data values $l_{d,\,m}$ described in the intervals of FIG. 14. Since the determination data $r_{4,\,4}$ is calculated as "improvement target A", "IMPROVEMENT TARGET A" is described in the corresponding interval $[a_{4,\,4}, a_{4,\,4}+b_{4,\,4}-1]$. In addition, since the determination data $r_{1,\,4}, r_{2,\,4}, r_{3,\,4}, r_{4,\,5}$ is calculated as "improvement target B", "IMPROVEMENT TARGET B" is described in the corresponding intervals $[a_{1,\,4}, a_{1,\,4}+b_{1,\,4}-1]$, $[a_{2,\,4}, a_{2,\,4}+b_{2,\,4}-1]$, $[a_{3,\,4}, a_{3,\,4}+b_{3,\,4}-1]$, and $[a_{4,\,5}, a_{4,\,5}+b_{4,\,5}-1]$.

In this case, referring to FIGS. 12(a) to 12(d), in each series of class numbers of the cyclic works d=1 to 3, only the fifth interval is classified to a class number "5". On the other hand, in the series of class numbers of the cyclic work d=4, the fourth and sixth intervals are classified to the class number "5". That is, the working subject has made an error in the procedure of the work in the cyclic work d=4, and has performed twice a work element which is usually performed only once (a work element in which a sensor data sequence similar to the standard pattern of the class number "5" is measured). In this situation, the number of intervals included in the cyclic works are different from each other, and a plurality of intervals of one cyclic work are classified to the identical class. As described above, it is considered that according to the prior art, the characteristic value cannot be calculated for each interval, because the corresponding intervals among the plurality of cyclic works are indefinite. On the other hand, according to the work analysis apparatus 1 of the present embodiment, the class data linker 40 calculates link data values by which the corresponding intervals among the plurality of cycles are associated with each other, and therefore, the determiner 50 can calculate characteristic values of the intervals correctly associated with each other.

Further, the determiner 50 outputs the characteristic values and the determination data calculated as the determination results, to the display device 3 external to the work analysis apparatus 1. The display device 3 is an imaging device for displaying the determination results, such as a liquid crystal display. Instead of the display device 3, a storage for storing the determination results, a communication device for transmitting the determination results, or the like may be provided. The work analysis apparatus 1 according to the present embodiment operates as described above.

Further, the operation of the work analysis apparatus 1 according to the present embodiment will be described with reference to a flowchart.

Figure 17:
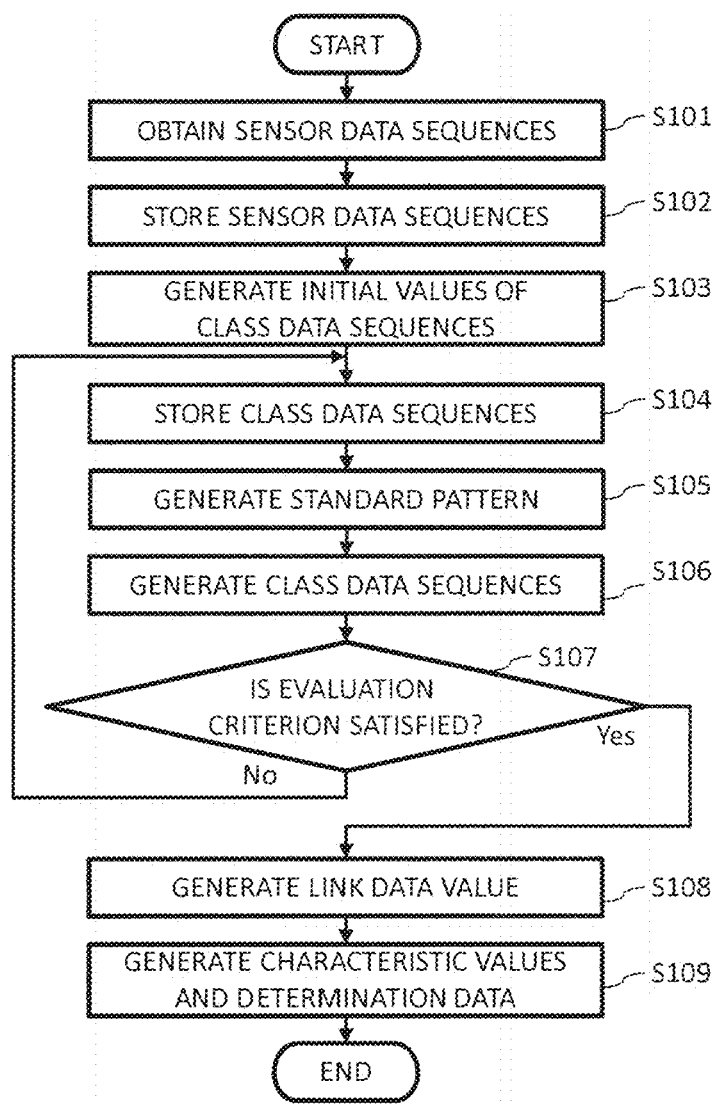
FIG. 17 is a flowchart showing an operation of the work analysis apparatus according to the first embodiment of the present invention.

FIG. 17 is a flowchart showing an operation of the work analysis apparatus 1 according to the present embodiment. At first, in step S101, the sensor data input device 10 obtains the sensor data sequences based on the sensor values outputted from the sensor 2 over the plurality of cyclic works. Next, in step S102, the sensor data storage device 31 stores the plurality of sensor data sequences obtained in step S101.

Next, in step S103, the first classifier 21 generates initial values of the plurality of class data sequences, based on the plurality of sensor data sequences stored in the sensor data storage device 31 in step S102. Next, in step S104, the class data storage device 32 stores the plurality of class data sequences. Next, in step S105, the standard pattern generator 22 generates the plurality of standard patterns, based on the plurality of sensor data sequences stored in the sensor data storage device in step S102, and based on the plurality of class data sequences stored in the class data storage device in step S104. Next, in step S106, the second classifier 23 generates the plurality of class data sequences, based on the plurality of sensor data sequences stored in the sensor data storage device in step S102, and based on the plurality of standard patterns generated in step S105. Next, in step S107, the class data evaluator 24 evaluates the plurality of class data sequences generated in step S106, using the predetermined evaluation criterion. When the class data sequences do not satisfy the evaluation criterion in step S107, the operation of the work analysis apparatus 1 returns to step S104. On the other hand, when the class data sequences satisfy the evaluation criterion in step S107, the operation of the work analysis apparatus 1 proceeds to step S108.

Next, in step S108, the class data linker 40 generates the link data values by which the corresponding intervals among the class data sequences are associated with each other, based on the plurality of class data sequences satisfying the evaluation criterion in step S107. Next, in step S109, the determiner 50 generates the characteristic values for the plurality of intervals associated with each other, and generates the determination data, based on the link data values generated in step S108.

When step S109 ends, the operation of the work analysis apparatus 1 ends. The work analysis apparatus 1 operates as described above.

Next, a hardware configuration for implementing the work analysis apparatus 1 according to the present embodiment will be described. The respective functions of the sensor data input device 10, the first classifier 21, the standard pattern generator 22, the second classifier 23, the class data evaluator 24, the class data linker 40, and the determiner 50 in the work analysis apparatus 1 may be implemented by a processing circuit(s). The processing circuit(s) may be a dedicated hardware device, or may be a general-purpose apparatus, such as a central processing unit (CPU) (also called processing unit, computing unit, microprocessor, microcomputer, processor, or digital signal processor) for executing a program stored in a memory. In addition, the respective functions of the sensor data storage device 31 and the class data storage device 32 may be implemented by a memory(s).

When the processing circuit is the dedicated hardware device, the processing circuit may be, for example, a single circuit, composite circuits, a programmed processor, a parallel-programmed processor, an application-specific integrated circuit (ASIC), a field-programmable gate array (FPGA), or a combination thereof. The functions of the respective parts of the sensor data input device 10, the first classifier 21, the standard pattern generator 22, the second classifier 23, the class data evaluator 24, the class data linker 40, and the determiner 50 may be individually implemented by a processing circuit(s), or the functions of the respective parts may be collectively implemented by a processing circuit(s).

When the processing circuit is the CPU, the respective functions of the sensor data input device 10, the first classifier 21, the standard pattern generator 22, the second classifier 23, the class data evaluator 24, the class data linker 40, and the determiner 50 are implemented by software, firmware, or a combination of software and firmware. Software and/or firmware are written as programs and stored in a memory(s). The processing circuit reads and performs the program stored in the memory, to implement the functions of each part. These programs may cause a computer to perform procedures and/or methods of the operations of the sensor data input device 10, the first classifier 21, the standard pattern generator 22, the second classifier 23, the class data evaluator 24, the class data linker 40, and the determiner 50. The term "memory" means: for example, a nonvolatile or volatile semiconductor memory, such as a random-access memory (RAM), a read-only memory (ROM), a flash memory, an erasable programmable ROM (EPROM), or an electrically erasable programmable ROM (EEPROM); a magnetic disk; a flexible disk; an optical disk; a compact disk; a mini-disk; a digital versatile disc (DVD), or the like.

Some of the respective functions of the sensor data input device 10, the first classifier 21, the standard pattern generator 22, the second classifier 23, the class data evaluator 24, the class data linker 40, and the determiner 50 may be implemented by dedicated hardware devices, and the other functions may be implemented by software or firmware. For example, the function of the sensor data input device 10 may be implemented by the processing circuit as the dedicated hardware device, and the respective functions of the first classifier 21, the standard pattern generator 22, the second classifier 23, the class data evaluator 24, the class data linker 40, and the determiner 50 may be implemented by the processing circuit reading and executing programs stored in the memory.

Figure 18:
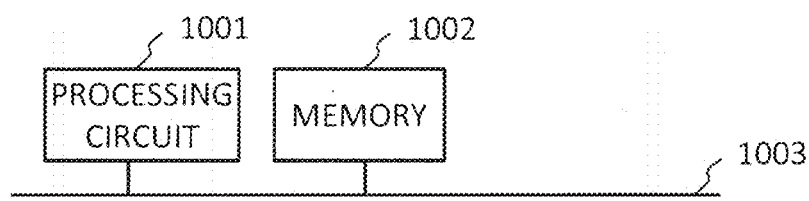
FIG. 18 is a diagram showing an example of a hardware configuration of the work analysis apparatus according to the first embodiment of the present invention.

FIG. 18 is a diagram showing an exemplary hardware configuration of the work analysis apparatus 1 according to the present embodiment. FIG. 18 shows an example of a case where a processing circuit 1001 is a dedicated hardware device. In the example of FIG. 18, the respective functions of the sensor data input device 10, the first classifier 21, the standard pattern generator 22, the second classifier 23, the class data evaluator 24, the class data linker 40, and the determiner 50 are implemented by the processing circuit 1001. In addition, the respective functions of the sensor data storage device 31 and the class data storage device 32 are implemented by a memory 1002. The processing circuit 1001 is connected to the memory 1002 via a data bus 1003.

Figure 19:
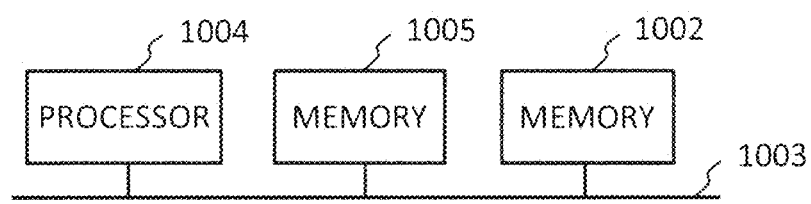
FIG. 19 is a diagram showing another exemplary hardware configuration of the work analysis apparatus according to the first embodiment of the present invention.

FIG. 19 is a diagram showing another exemplary hardware configuration of the work analysis apparatus 1 according to the present embodiment. FIG. 19 shows an exemplary hardware configuration when the processing circuit is a CPU. In the example of FIG. 19, the respective functions of the sensor data input device 10, the first classifier 21, the standard pattern generator 22, the second classifier 23, the class data evaluator 24, the class data linker 40, and the determiner 50 are implemented by a processor 1004 executing programs stored in a memory 1005. In addition, the respective functions of the sensor data storage device 31 and the class data storage device 32 are implemented by a memory 1002. The processor 1004 is connected to the memory 1002 and the memory 1005 via the data bus 1003.

Note that a work analysis apparatus according to a second embodiment can also be implemented with a similar hardware configuration to that of the work analysis apparatus 1 according to the first embodiment.

As described above, according to the work analysis apparatus 1 of the present embodiment, it is not necessary to design templates, standard working times, and the like in advance, and it is possible to calculate the characteristic values for the respective work elements, and determine an interval to be improved, based only on sensor data measured from the work to be analyzed, even when the working subject has made an error in the work's procedure.

In addition, according to the work analysis apparatus 1 of the present embodiment, since it is not necessary to store templates, standard working times, and the like designed in advance, it is possible to reduce the required memory area. Further, since the calculation time is not required for designing the templates and the standard working times in advance, it is possible to accelerate the preliminary calculation process of the work analysis.

Second Embodiment

An improvement mode may occur as a result of the working subject has performed a work. The improvement mode is a generic term for events requiring improvement in each cyclic work, such as production of defective products by the work, and an excessive working time, and the like. Examples of the improvement mode include "forgetting to tighten screws" and "exceeding the cycle time". In the cyclic work with "forgetting to tighten screws", a work required for usual work may be skipped. In addition, when "exceeding the cycle time" occurs, a work unnecessary for usual work may be performed. A work analysis apparatus according to the present embodiment calculates differences in works as characteristic values for the respective improvement modes, when a user inputs the improvement mode. Thus, it aims to facilitate to determine intervals having a cause of the improvement mode.

Figure 20:
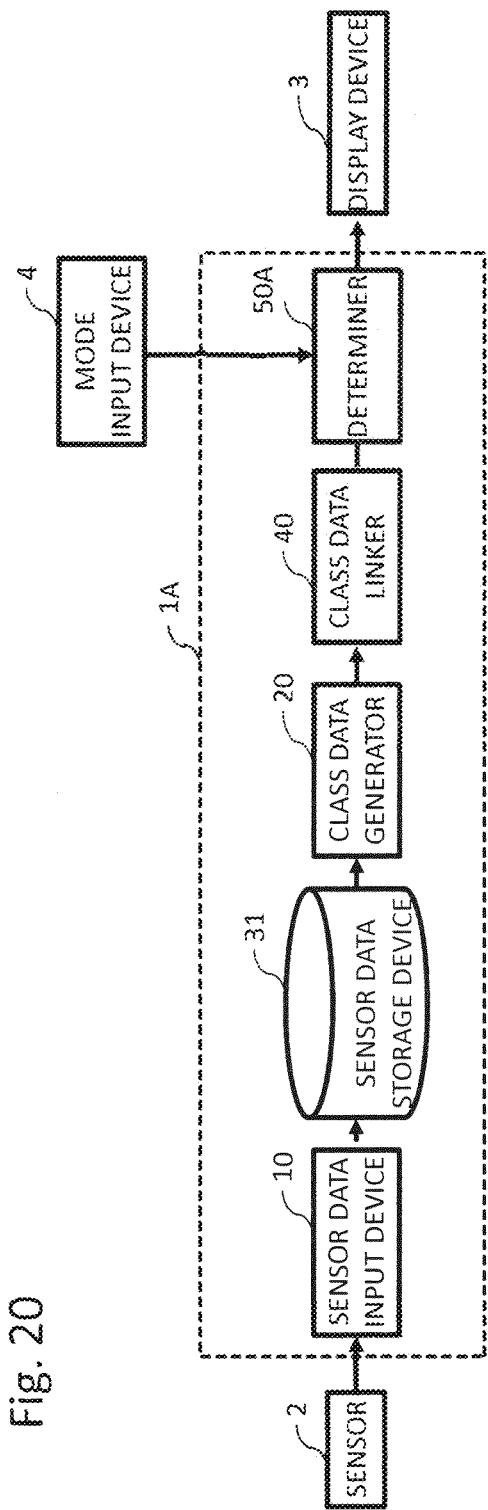
FIG. 20 is a diagram showing an exemplary configuration of a work analysis apparatus according to a second embodiment of the present invention.

FIG. 20 is a diagram showing an exemplary configuration of a work analysis apparatus 1A according to the present embodiment. The work analysis apparatus 1A according to the present embodiment differs from the work analysis apparatus 1 according to the first embodiment, in that the user determines a result of a work, inputs an improvement mode occurring as the result of the work, and determines intervals including actions which has caused the improvement mode and should be improved.

A mode input device 4 is connected to the work analysis apparatus 1A according to the present embodiment. In addition, the work analysis apparatus 1A differs from the work analysis apparatus 1 according to the first embodiment, in a part of the operation of a determiner 50A. As a result, the work analysis apparatus 1A according to the present embodiment can easily determine the intervals including the actions which has caused the improvement mode and should be improved. Hereinafter, the differences from the work analysis apparatus 1 according to the first embodiment will be mainly described.

At first, the mode input device 4 according to the present embodiment will be described. The mode input device 4 obtains a user input indicating an improvement mode $md_d$ generated as a result of each of the plurality of cyclic works. In the present embodiment, the mode input device 4 obtains, as the improvement mode, a user input indicating "usual" or "excess" regarding the cycle time taken for the work. The mode input device 4 is configured as a device into which external information can be inputted, such as a keyboard or a touch panel, a memory card reader, or the like. As another example, the mode input device 4 may obtain, as the improvement mode, a user input indicating "good" or "defective" regarding the quality of the product.

Next, the determiner 50A according to the present embodiment will be described. The determiner 50A calculates characteristic values of the intervals, for each set of the intervals associated with each other, based on the improvement mode $md_d$ inputted from the mode input device 4, and based on the link data values $l_{d,m}$ generated by the class data linker 40, and determines intervals including actions which should be improved, as determination data, the actions being common to cyclic works in which the same improvement mode has occurred.

Figure 22:
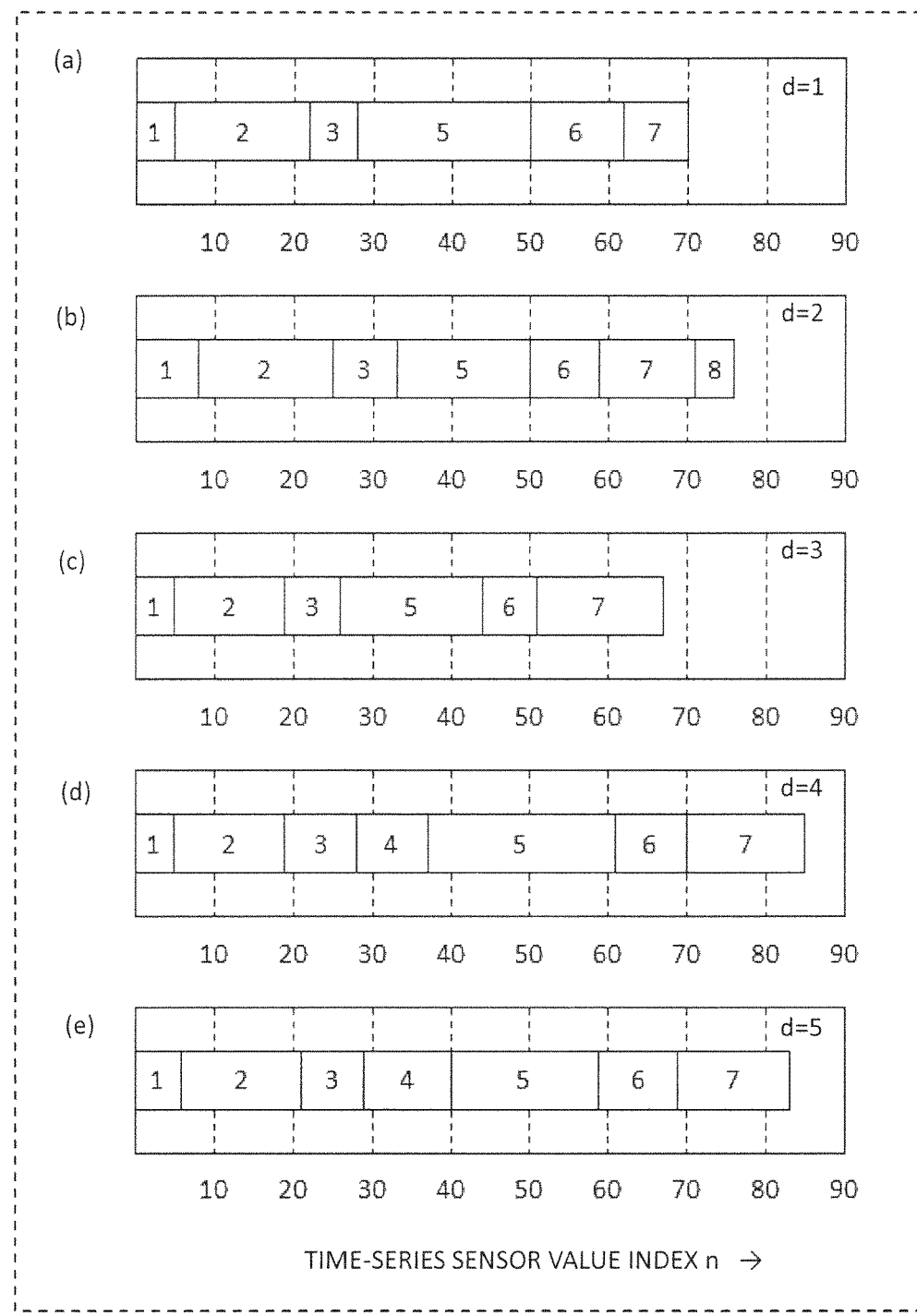
FIG. 22 is a set of time-series graphs showing the link data values generated by the class data linker according to the second embodiment of the present invention.

FIG. 21 is a diagram for explaining a data structure of link data values generated by the class data linker 40 according to the present embodiment. FIG. 21 shows the class data sequences $s_{d,m}$ generated by the second classifier 23, and the link data values $l_{d,m}$ generated by the class data linker 40, from the sensor data sequences obtained by cyclic works of D=5, side by side. FIG. 22 is a set of time-series graphs showing the link data values shown in FIG. 21. Referring to FIG. 22, the horizontal axis represents the index "n" of the time-series sensor values outputted in the cyclic work "d", and the number "n" of the sensor values $x_d(n)$ in the sensor data sequence $x_d$, and rectangles including numbers "1" to "8" represent intervals $[a_{d,m}, a_{d,m}+b_{d,m}-1]$ obtained by dividing the sensor data sequence $x_d$. In addition, the numerals "1" to "8" described in the respective intervals represent the link data values $l_{d,m}$.

The determiner 50A calculates a count value $cnt2_{d,m}$, that is the number of intervals with the improvement mode $md_d$="usual", to which the identical link number is assigned, as a characteristic value for each set of the intervals associated with each other based on the link data values $l_{d,m}$. Further, the determiner 50A calculates determination data $r2_{d,m}$ using Mathematical Expression (11) based on the count value $cnt2_{d,m}$. In this case, $cnt2_{th}$ is a predetermined threshold.

[Mathematical Expression 11]

$$r2_{d,m} = \begin{cases} \text{Improvement target } C \, (cnt2_{d,m} \le cnt2_{th}) \\ \text{Normal (Otherwise)} \end{cases}$$

In this case, an improvement target C is a label for intervals determined to be characteristic to the cyclic works into which the improvement mode "excess" is inputted, that is, intervals in which actions causing "excess" are performed in the series of actions.

FIG. 23 is a diagram for explaining a data structure of characteristic values and determination data calculated by the determiner 50A according to the present embodiment. In FIG. 23, the class data sequences $s_{d,m}$ generated by the second classifier 23, the link data values $l_{d,m}$ generated by the class data linker 40, the count values $cnt2_{d,m}$ and the determination data $r2_{d,m}$ calculated by the determiner 50A are shown in an ordered manner based on the link data values $l_{d,m}$. In the example shown in FIG. 23, the determiner 50A sets the threshold $cnt2_{th}=0$ in Mathematical Expression (11) to determine whether or not the actions of the working subject should be improved.

Referring to FIG. 23, for example, two link data values {14, 4, 15, 4} have the value "4". Since the corresponding improvement modes $md_4$ and $md_5$ are both "excess", the count values satisfy: $cnt2_{4,4}=cnt2_{5,4}=0 \le cnt2_{th}$. Therefore, the determiner 50A calculates the determination data $r2_{4,4}=r2_{5,4}=$"improvement target C" using Mathematical Expression (11).

In addition, only one link data value $\{l_{2,7}\}$ has a value "8". The corresponding improvement mode $md_2$ is "usual", and therefore, the count value satisfies: $cnt2_{2,7}=1 > cnt2_{th}$. Therefore, the determiner 50A calculates the determination data $r2_{2,7}=$"normal" using Mathematical Expression (11).

Figure 24:
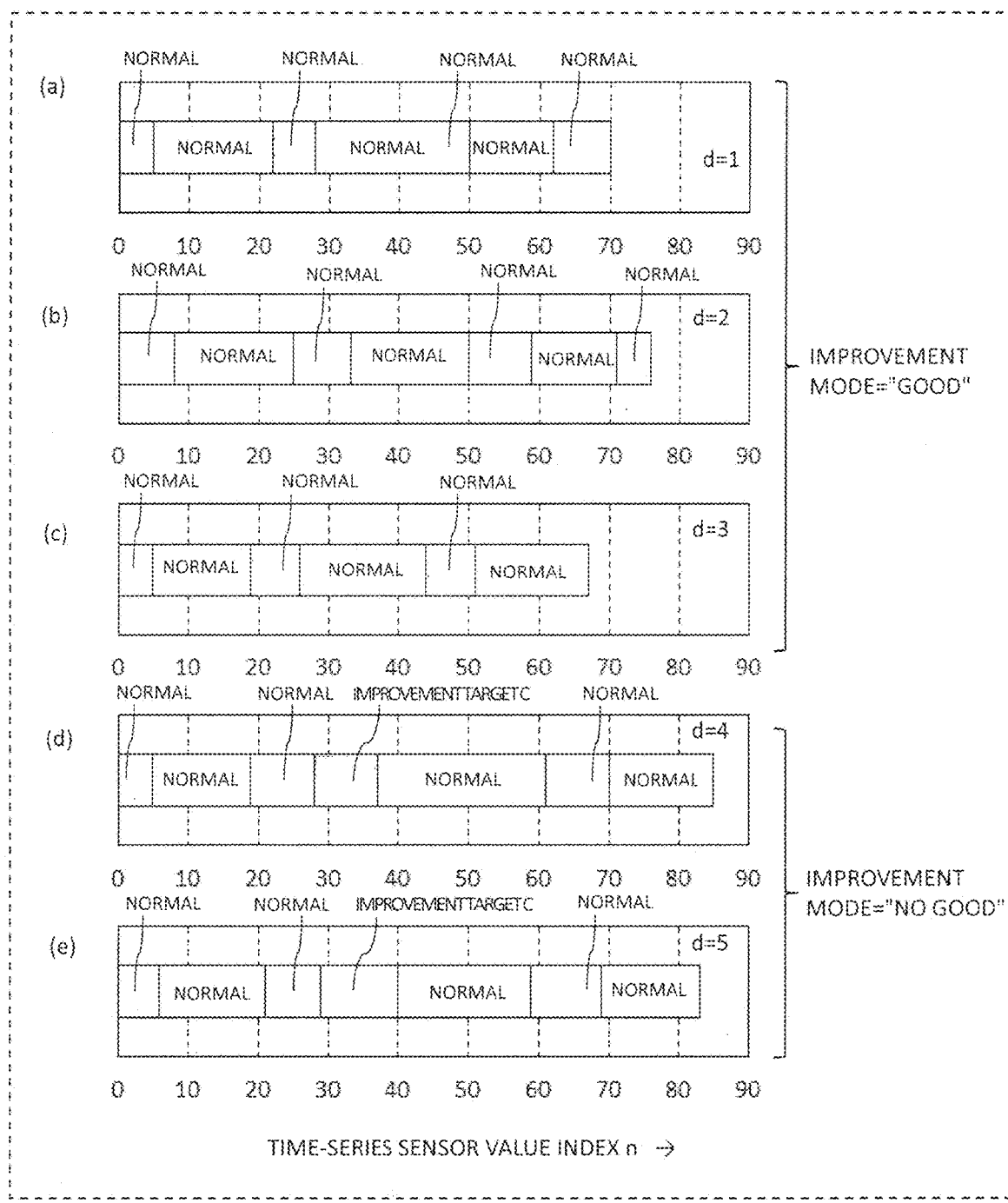
FIG. 24 is a set of time-series graphs showing the determination data calculated by the determiner according to the second embodiment of the present invention.

FIG. 24 is a set of time-series graphs showing the determination data shown in FIG. 23. FIG. 24 shows the contents of the determination data $r2_{d,m}$, instead of the corresponding numbers "1" to "8" representing the link data values $l_{d,m}$ described in the intervals of FIG. 22. Since the determination data $r2_{4,4}, r2_{5,4}$ is calculated as "improvement target C", "improvement target C" is described in the corresponding intervals $[a_{4,4}, a_{4,4}+b_{4,4}-1], [a_{5,4}, a_{5,4}+b_{5,4}-1]$.

The determiner 50A further outputs the determination data as the determination result, to the display device 3 external to the work analysis apparatus 1A. The display device 3 is an imaging device for displaying the determination data, such as a liquid crystal display. Instead of the display device 3, a storage for storing the determination results, a communication device for transmitting the determination results, or the like may be provided. The work analysis apparatus 1A according to the present embodiment operates as described above.

As described above, according to the work analysis apparatus 1A of the present embodiment, it is possible to easily determine the intervals of the work having a cause of the improvement mode, only based on data measured for the work of the working subject, and based on the improvement mode occurring as a result of the work, without designing templates, standard working times, and the like in advance.

According to the present embodiment, "usual", "excess", or the like relating to the cycle time taken for the cyclic work are set as the improvement mode. However, alternatively, "beginner", "expert", or the like regarding the working subject performing the cyclic work may be set. That is, differences occur in the required time of the work, the quality of the product, and the like, depending on whether the working subject is a beginner or an expert. In order to improve productivity, it is important to quickly improve the skill level of a beginner, and therefore, it is necessary to specifically point out actions which should be improved in the beginner's work. According to the work analysis apparatus 1A of the present embodiment, as described above, differences among the inputted improvement modes can be calculated as characteristic values. Therefore, by inputting "beginner" or "expert" as the improvement mode, it is possible to easy determine intervals in which a difference between "beginner" and "expert" occurs. In addition, the determiner 50A according to the present embodiment calculates the count values as the characteristic values, but not limited thereto. For example, by calculating the variation coefficients, it is possible to easily determine intervals in which the work cannot be performed stably (variation occurs), using the improvement mode.

Modified Embodiment

Note that the embodiments of the present invention can also be applied to cases where the working subject is other than a person. For example, in an application to operations of a machine under indefinite controls, such as a work robot adaptively controlled in response to an external environment, it is considered difficult in many cases for an analyst to determine a cause of the improvement modes of the cyclic works, and therefore, it is effective to apply the present invention.

The standard pattern generator according to the embodiments of the present invention generates the standard patterns as the set of Gaussian distributions of the sensor values at respective moments. Alternatively, other appropriate probability distributions may be used, instead of the Gaussian distributions.

The sensor data input device may be provided with a removable storage medium reader device, instead of being connected to the sensor. Thus, the sensor data input device may read sensor data sequences measured in the past from the storage medium, instead of obtaining real-time sensor data sequences detected by the sensor.

INDUSTRIAL APPLICABILITY

The present invention is applicable to a work analysis apparatus that analyzes a work including a series of actions performed by a working subject.

REFERENCE SIGNS LIST 1, 1A: WORK ANALYSIS APPARATUS
2: SENSOR
3: DISPLAY DEVICE
4: MODE INPUT DEVICE
10: SENSOR DATA INPUT DEVICE
20: CLASS DATA GENERATOR
21: FIRST CLASSIFIER
22: STANDARD PATTERN GENERATOR
23: SECOND CLASSIFIER
24: CLASS DATA EVALUATOR
31: SENSOR DATA STORAGE DEVICE
32: CLASS DATA STORAGE DEVICE
40: CLASS DATA LINKER
50, 50A: DETERMINER
100: WORKING SUBJECT
101: LEFT HAND OF WORKING SUBJECT
102: RIGHT HAND OF WORKING SUBJECT
1001: PROCESSING CIRCUIT
1002, 1005: MEMORY
1003: DATA BUS
1004: PROCESSOR

The invention claimed is:

1. A work analysis apparatus for analyzing a work including a series of actions performed by a working subject, the work analysis apparatus comprising processing circuitry configured as:

a sensor data input device that obtains a plurality of sensor data sequences, each of the sensor data sequences indicating time-series sensor values generated by measuring a work of the working subject using a sensor, the sensor data sequences being generated corresponding to repetitions of the work when the working subject repeatedly performs the work a plurality of times;

a class data generator that determines a plurality of intervals obtained by temporally dividing each of the sensor data sequences based on the sensor values included in the sensor data sequences, determines classes of the intervals, each of the classes indicating a type of temporal variations in the sensor values included in one of the intervals, the classes being identified by integer symbols, and generates a plurality of first class data sequences for each of the sensor data sequences, each of the first class data sequences indicating the intervals and the classes of the sensor data sequence;

a class data linker that associates the intervals having an identical class and corresponding to each other, with each other, among the plurality of first class data sequences, based on the plurality of first class data sequences; and a determiner that calculates characteristic values of the intervals associated with each other by the class data linker, and the determiner is further configured to determine, based on the characteristic values of the intervals, whether the actions of the working subject in the intervals should be improved, wherein the class data generator generates a plurality of standard patterns based on the plurality of sensor data sequences, each of the standard patterns indicating standard temporal variations in the sensor values included in each of the intervals, the standard patterns corresponding to the plurality of classes, respectively, wherein the class data generator generates the plurality of first class data sequences using the plurality of standard patterns, wherein the class data generator comprises:

a first classifier that generates initial values of a plurality of second class data sequences for each of the sensor data sequences, each of the second class data sequences indicating the intervals and the classes of the sensor data sequence, a standard pattern generator that generates the plurality of standard patterns based on the plurality of sensor data sequences and the plurality of second class data sequences, a second classifier that generates a plurality of third class data sequences for each of the sensor data sequences using the plurality of standard patterns, each of the third class data sequences indicating the intervals and the classes of the sensor data sequence, a class data evaluator that updates the second class data sequences with the third class data sequences when the third class data sequences do not satisfy a predetermined evaluation criterion, and generates the third class data sequences as the first class data sequences when the third class data sequences satisfy the evaluation criterion, and wherein the class data generator repeats generating the standard patterns by the standard pattern generator, generating the third class data sequences by the second classifier, and updating the second class data sequences by the class data evaluator, until the third class data sequences satisfy the evaluation criterion.

2. The work analysis apparatus as claimed in claim 1, wherein the class data generator performs machine learning using the plurality of sensor data sequences, and generates the plurality of standard patterns so as to satisfy a predetermined evaluation criterion.

3. The work analysis apparatus as claimed in claim 1,
wherein the first classifier divides each of the sensor data sequences to a plurality of intervals, the number of which is equal to the number of the classes, and which have lengths equal to each other, and
wherein the first classifier classifies, for each of the sensor data sequences, the plurality of intervals obtained by dividing the sensor data sequence to the plurality of classes based on a temporal order of the intervals,
whereby the first classifier generates the initial values of the plurality of second class data sequences.

4. The work analysis apparatus as claimed in claim 1,
wherein the class data evaluator calculates a degree of similarity between the third class data sequences and the second class data sequences, and when the degree of similarity is higher than a first threshold, the class data evaluator determines that the third class data sequences satisfy the evaluation criterion.

5. The work analysis apparatus as claimed in claim 1,
wherein the class data generator generates the standard patterns as probability distributions of the sensor values at respective moments.

6. The work analysis apparatus as claimed in claim 1,
wherein the determiner calculates a count value indicating a number of the intervals associated with each other by the class data linker, as the characteristic value of the intervals, and when there is an interval having the count value lower than a second threshold, the determiner determines that the actions of the working subject in the interval should be improved.

7. The work analysis apparatus as claimed in claim 1,
wherein the determiner calculates a variation coefficient indicating variations in a length of the intervals associated with each other by the class data linker, as the characteristic values of the intervals, and when there is an interval having the variation coefficient higher than a third threshold, the determiner determines that the actions of the working subject in the interval should be improved.

8. The work analysis apparatus as claimed in claim 1, comprising a mode input device that inputs a mode of the work,
wherein the determiner calculates characteristic values of the intervals, based on the intervals associated with each other by the class data linker, and based on the mode.

9. The work analysis apparatus as claimed in claim 1, further comprising:
the sensor, wherein the sensor includes a three-dimensional acceleration sensor.

10. The work analysis apparatus as claimed in claim 9, wherein:
the sensor is configured to detect, as the sensor data sequences, a state of the working subject while the working subject is performing the work, and
the state of the working subject including at least one of a position of a hand, a position of a head, an angle of a joint, a heart rate, and a respiration rate.

11. A work analysis apparatus for analyzing a work including a series of actions performed by a working subject, the work analysis apparatus comprising at least one processing circuit configured to executing steps of:
obtaining a plurality of sensor data sequences, each of the sensor data sequences indicating time-series sensor values generated by measuring a work of the working subject using a sensor, the sensor data sequences being generated corresponding to repetitions of the work when the working subject repeatedly performs the work a plurality of times;
determining a plurality of intervals obtained by temporally dividing each of the sensor data sequences based on the sensor values included in the sensor data sequences;
determining classes of the intervals, each of the classes indicating a type of temporal variations in the sensor values included in one of the intervals, the classes being identified by integer symbols;
generating a plurality of first class data sequences for each of the sensor data sequences, each of the first class data sequences indicating the intervals and the classes of the sensor data sequence;
associating the intervals having an identical class and corresponding to each other, with each other, among the plurality of first class data sequences, based on the plurality of first class data sequences;
calculating characteristic values of the intervals associated with each other; and
determining, based on the characteristic values of the intervals, whether the actions of the working subject in the intervals should be improved;
wherein the at least one processing circuit is further configured to executing steps of:
generating a plurality of standard patterns based on the plurality of sensor data sequences, each of the standard patterns indicating standard temporal variations in the sensor values included in each of the intervals, the standard patterns corresponding to the plurality of classes, respectively, and
generating the plurality of first class data sequences using the plurality of standard patterns, and
wherein the at least one processing circuit is further configured to executing steps of:
generating initial values of a plurality of second class data sequences for each of the sensor data sequences, each of the second class data sequences indicating the intervals and the classes of the sensor data sequence;
generating the plurality of standard patterns based on the plurality of sensor data sequences and the plurality of second class data sequences;
generating a plurality of third class data sequences for each of the sensor data sequences using the plurality of standard patterns, each of the third class data sequences indicating the intervals and the classes of the sensor data sequence;
updating the second class data sequences with the third class data sequences when the third class data sequences do not satisfy a predetermined evaluation criterion, and generating the third class data sequences as the first class data sequences when the third class data sequences satisfy the evaluation criterion; and
wherein the at least one processing circuit is further configured to repeat generating the standard patterns, generating the third class data sequences, and updating the second class data sequences, until the third class data sequences satisfy the evaluation criterion.

* * * * *